(12) United States Patent
Oyanagi et al.

(10) Patent No.: US 10,515,660 B2
(45) Date of Patent: *Dec. 24, 2019

(54) MAGNETIC TAPE HAVING CONTROLLED SURFACE PROPERTIES OF THE BACK COATING LAYER AND MAGNETIC LAYER

(71) Applicant: FUJIFILM Corporation, Tokyo (JP)

(72) Inventors: Masahito Oyanagi, Minami-ashigara (JP); Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/619,012

(22) Filed: Jun. 9, 2017

(65) Prior Publication Data

US 2017/0372737 A1 Dec. 28, 2017

(30) Foreign Application Priority Data

Jun. 22, 2016 (JP) ................................ 2016-123207

(51) Int. Cl.
*G11B 5/70* (2006.01)
*G11B 5/64* (2006.01)
(Continued)

(52) U.S. Cl.
CPC .......... *G11B 5/645* (2013.01); *G11B 5/00813* (2013.01); *G11B 5/66* (2013.01);
(Continued)

(58) Field of Classification Search
None
See application file for complete search history.

(56) References Cited

U.S. PATENT DOCUMENTS

| 3,966,686 A | 6/1976 | Asakura et al. |
| 4,112,187 A | 9/1978 | Asakura et al. |

(Continued)

FOREIGN PATENT DOCUMENTS

| DE | 101 46 429 A1 | 3/2002 |
| GB | 2495356 A | 4/2013 |

(Continued)

OTHER PUBLICATIONS

Machine Translation of JP 61-139923 A (Year: 1986).*

(Continued)

*Primary Examiner* — Kevin M Bernatz
(74) *Attorney, Agent, or Firm* — Sughrue Mion, PLLC

(57) ABSTRACT

A magnetic tape is provided in which the center line average surface roughness Ra measured regarding the surface of the magnetic layer is less than or equal to 1.8 nm, and the logarithmic decrement acquired by a pendulum viscoelasticity test performed regarding the surface of the magnetic layer is less than or equal to 0.050. A back coating layer includes one or more components selected from a fatty acid and a fatty acid amide. In addition, the C—H derived C concentration calculated from the C—H peak area ratio of C1s spectra obtained by X-ray photoelectron spectroscopic analysis performed regarding the surface of the back coating layer at a photoelectron take-off angle of 10 degrees is greater than or equal to 35 atom %.

9 Claims, 3 Drawing Sheets

(51) Int. Cl.
  *G11B 5/008* (2006.01)
  *G11B 5/66* (2006.01)
  *G11B 5/78* (2006.01)
  *G11B 5/735* (2006.01)

(52) U.S. Cl.
  CPC ............... *G11B 5/70* (2013.01); *G11B 5/735* (2013.01); *G11B 5/78* (2013.01)

(56) References Cited

U.S. PATENT DOCUMENTS

| | | | |
|---|---|---|---|
| 4,425,404 A | 1/1984 | Suzuki et al. | |
| 4,693,930 A | 9/1987 | Kuo et al. | |
| 4,746,569 A * | 5/1988 | Takahashi | G11B 5/70 427/128 |
| 4,825,317 A * | 4/1989 | Rausch | G11B 15/58 360/128 |
| 5,242,752 A | 9/1993 | Isobe et al. | |
| 5,419,938 A | 5/1995 | Kagotani et al. | |
| 5,445,881 A | 8/1995 | Irie | |
| 5,474,814 A * | 12/1995 | Komatsu | G11B 5/738 427/130 |
| 5,496,607 A | 3/1996 | Inaba et al. | |
| 5,540,957 A | 7/1996 | Ueda et al. | |
| 5,585,032 A | 12/1996 | Nakata et al. | |
| 5,645,917 A | 7/1997 | Ejiri et al. | |
| 5,689,384 A | 11/1997 | Albrecht et al. | |
| 5,728,454 A | 3/1998 | Inaba et al. | |
| 5,786,074 A | 7/1998 | Soui | |
| 5,827,600 A | 10/1998 | Ejiri et al. | |
| 6,099,957 A | 8/2000 | Yamamoto et al. | |
| 6,183,606 B1 | 2/2001 | Kuo et al. | |
| 6,207,252 B1 * | 3/2001 | Shimomura | G11B 5/70 428/141 |
| 6,228,461 B1 | 5/2001 | Sueki et al. | |
| 6,254,964 B1 | 7/2001 | Saito et al. | |
| 6,261,647 B1 * | 7/2001 | Komatsu | G11B 5/845 118/620 |
| 6,268,043 B1 | 7/2001 | Koizumi et al. | |
| 6,496,328 B1 | 12/2002 | Dugas | |
| 6,579,826 B2 | 6/2003 | Furuya et al. | |
| 6,649,256 B1 * | 11/2003 | Buczek | B05D 1/40 428/323 |
| 6,686,022 B2 | 2/2004 | Takano et al. | |
| 6,770,359 B2 | 8/2004 | Masaki | |
| 6,791,803 B2 | 9/2004 | Saito et al. | |
| 6,835,461 B1 | 12/2004 | Yamagata et al. | |
| 6,893,746 B1 | 5/2005 | Kirino et al. | |
| 6,921,592 B2 | 7/2005 | Tani et al. | |
| 6,939,606 B2 | 9/2005 | Hashimoto et al. | |
| 6,950,269 B1 | 9/2005 | Johnson | |
| 6,994,925 B2 | 2/2006 | Masaki | |
| 7,014,927 B2 | 3/2006 | Sueki et al. | |
| 7,029,726 B1 | 4/2006 | Chen et al. | |
| 7,153,366 B1 | 12/2006 | Chen et al. | |
| 7,255,908 B2 | 8/2007 | Ishikawa et al. | |
| 7,511,907 B2 | 3/2009 | Dugas et al. | |
| 7,515,383 B2 | 4/2009 | Saito et al. | |
| 7,803,471 B1 | 9/2010 | Ota et al. | |
| 7,839,599 B2 | 11/2010 | Bui et al. | |
| 8,000,057 B2 | 8/2011 | Bui et al. | |
| 8,524,108 B2 | 9/2013 | Hattori | |
| 8,535,817 B2 * | 9/2013 | Imaoka | G11B 5/70 428/844 |
| 8,576,510 B2 | 11/2013 | Cherubini et al. | |
| 8,681,451 B2 | 3/2014 | Harasawa et al. | |
| 9,105,294 B2 | 8/2015 | Jensen et al. | |
| 9,311,946 B2 | 4/2016 | Tanaka et al. | |
| 9,495,985 B2 | 10/2016 | Xia et al. | |
| 9,530,444 B2 * | 12/2016 | Kasada | G11B 5/7085 |
| 9,542,967 B2 | 1/2017 | Sekiguchi et al. | |
| 9,564,161 B1 | 2/2017 | Cherubini et al. | |
| 9,601,146 B2 | 7/2017 | Zhang et al. | |
| 9,704,525 B2 * | 7/2017 | Kasada | G11B 5/7013 |
| 9,704,527 B2 | 7/2017 | Kasada | |
| 9,711,174 B2 * | 7/2017 | Kasada | G11B 5/71 |
| 9,721,605 B2 * | 8/2017 | Oyanagi | G11B 5/71 |
| 9,721,606 B2 * | 8/2017 | Kasada | G11B 5/8404 |
| 9,721,607 B2 | 8/2017 | Tada et al. | |
| 9,748,026 B2 | 8/2017 | Shirata | |
| 9,704,425 B2 | 9/2017 | Kasada et al. | |
| 9,773,519 B2 | 9/2017 | Kasada et al. | |
| 9,779,772 B1 | 10/2017 | Kasada et al. | |
| 9,837,104 B1 | 12/2017 | Biskeborn | |
| 9,837,116 B2 * | 12/2017 | Ozawa | G11B 5/00813 |
| 9,959,894 B2 | 5/2018 | Omura | |
| 9,972,351 B1 | 5/2018 | Kaneko et al. | |
| 9,978,414 B1 | 5/2018 | Kaneko et al. | |
| 9,984,710 B2 * | 5/2018 | Kasada | G11B 5/68 |
| 9,984,712 B1 | 5/2018 | Ozawa | |
| 9,984,716 B1 * | 5/2018 | Kaneko | G11B 5/70 |
| 10,008,230 B1 | 6/2018 | Ozawa et al. | |
| 10,026,430 B2 | 7/2018 | Kasada et al. | |
| 10,026,433 B2 | 7/2018 | Kasada et al. | |
| 10,026,434 B2 * | 7/2018 | Oyanagi | G11B 5/70 |
| 10,026,435 B2 * | 7/2018 | Kasada | G11B 5/78 |
| 10,062,403 B1 * | 8/2018 | Kasada | G11B 5/70 |
| 10,074,393 B2 * | 9/2018 | Kaneko | G11B 5/70615 |
| 10,134,433 B2 | 11/2018 | Kasada et al. | |
| 10,170,144 B2 | 1/2019 | Ozawa et al. | |
| 2001/0038928 A1 * | 11/2001 | Nakamigawa | G11B 5/70 428/832.2 |
| 2001/0053458 A1 | 12/2001 | Suzuki et al. | |
| 2002/0072472 A1 | 7/2002 | Furuya et al. | |
| 2002/0122339 A1 | 9/2002 | Takano et al. | |
| 2003/0059649 A1 | 3/2003 | Saliba et al. | |
| 2003/0091866 A1 | 5/2003 | Ejiri et al. | |
| 2003/0124386 A1 | 7/2003 | Masaki | |
| 2003/0170498 A1 * | 9/2003 | Inoue | G11B 5/735 428/845.4 |
| 2003/0228493 A1 | 12/2003 | Doushita et al. | |
| 2004/0018388 A1 | 1/2004 | Kitamura et al. | |
| 2004/0053074 A1 | 3/2004 | Jingu et al. | |
| 2004/0072025 A1 | 4/2004 | Kishimoto et al. | |
| 2004/0197605 A1 | 10/2004 | Seki et al. | |
| 2004/0213948 A1 | 10/2004 | Saito et al. | |
| 2004/0218304 A1 | 11/2004 | Goker et al. | |
| 2004/0265643 A1 | 12/2004 | Ejiri | |
| 2005/0057838 A1 | 3/2005 | Ohtsu | |
| 2005/0153170 A1 | 7/2005 | Inoue et al. | |
| 2005/0196645 A1 | 9/2005 | Doi et al. | |
| 2005/0260456 A1 | 11/2005 | Hanai et al. | |
| 2005/0260459 A1 | 11/2005 | Hanai et al. | |
| 2005/0264935 A1 | 12/2005 | Sueki et al. | |
| 2006/0008681 A1 | 1/2006 | Hashimoto et al. | |
| 2006/0035114 A1 * | 2/2006 | Kuse | G11B 5/708 428/844 |
| 2006/0056095 A1 | 3/2006 | Saitou | |
| 2006/0068232 A1 | 3/2006 | Mikamo et al. | |
| 2006/0187589 A1 | 8/2006 | Harasawa et al. | |
| 2006/0232883 A1 | 10/2006 | Biskeborn et al. | |
| 2007/0009769 A1 | 1/2007 | Kanazawa | |
| 2007/0020489 A1 | 1/2007 | Yamazaki et al. | |
| 2007/0020490 A1 | 1/2007 | Harasawa et al. | |
| 2007/0224456 A1 | 9/2007 | Murao et al. | |
| 2007/0230054 A1 | 10/2007 | Takeda et al. | |
| 2007/0231606 A1 | 10/2007 | Hanai | |
| 2008/0057351 A1 | 3/2008 | Meguro et al. | |
| 2008/0144211 A1 | 6/2008 | Weber et al. | |
| 2008/0152956 A1 | 6/2008 | Murayama et al. | |
| 2008/0174897 A1 | 7/2008 | Bates et al. | |
| 2008/0297950 A1 | 12/2008 | Noguchi et al. | |
| 2008/0311308 A1 | 12/2008 | Lee et al. | |
| 2009/0027812 A1 | 1/2009 | Noguchi et al. | |
| 2009/0087689 A1 | 4/2009 | Doushita et al. | |
| 2009/0161249 A1 | 6/2009 | Takayama et al. | |
| 2009/0162701 A1 | 6/2009 | Jensen et al. | |
| 2010/0000966 A1 | 1/2010 | Kamata et al. | |
| 2010/0035086 A1 | 2/2010 | Inoue et al. | |
| 2010/0035088 A1 | 2/2010 | Inoue | |
| 2010/0053810 A1 | 3/2010 | Biskeborn et al. | |
| 2010/0073816 A1 | 3/2010 | Komori et al. | |
| 2010/0081011 A1 | 4/2010 | Nakamura | |
| 2010/0134929 A1 | 6/2010 | Ito | |

(56) References Cited

U.S. PATENT DOCUMENTS

| | | | |
|---|---|---|---|
| 2010/0227201 A1 | 9/2010 | Sasaki et al. | |
| 2010/0246073 A1 | 9/2010 | Katayama | |
| 2011/0003241 A1* | 1/2011 | Kaneko | C08G 73/0206 430/7 |
| 2011/0051280 A1 | 3/2011 | Karp et al. | |
| 2011/0052908 A1 | 3/2011 | Imaoka | |
| 2011/0077902 A1 | 3/2011 | Awezec et al. | |
| 2011/0151281 A1 | 6/2011 | Inoue | |
| 2011/0244272 A1 | 10/2011 | Suzuki et al. | |
| 2012/0045664 A1* | 2/2012 | Tanaka | G11B 5/71 428/840.2 |
| 2012/0152891 A1 | 6/2012 | Brown et al. | |
| 2012/0177951 A1 | 7/2012 | Yamazaki et al. | |
| 2012/0183811 A1 | 7/2012 | Hattori et al. | |
| 2012/0196156 A1* | 8/2012 | Suzuki | G11B 5/70 428/844 |
| 2012/0243120 A1 | 9/2012 | Harasawa et al. | |
| 2012/0244387 A1 | 9/2012 | Mori et al. | |
| 2012/0251845 A1 | 10/2012 | Wang et al. | |
| 2013/0029183 A1 | 1/2013 | Omura et al. | |
| 2013/0084470 A1 | 4/2013 | Hattori et al. | |
| 2013/0088794 A1 | 4/2013 | Cherubini et al. | |
| 2013/0256584 A1* | 10/2013 | Yamazaki | H01F 1/01 252/62.58 |
| 2013/0260179 A1 | 10/2013 | Kasada et al. | |
| 2013/0279040 A1* | 10/2013 | Cideciyan | H03M 13/13 360/53 |
| 2013/0286510 A1 | 10/2013 | Rothermel et al. | |
| 2014/0011055 A1 | 1/2014 | Suzuki et al. | |
| 2014/0130067 A1 | 5/2014 | Madison et al. | |
| 2014/0139944 A1 | 5/2014 | Johnson et al. | |
| 2014/0272474 A1* | 9/2014 | Kasada | G11B 5/7085 428/842.8 |
| 2014/0295214 A1 | 10/2014 | Tada et al. | |
| 2014/0342189 A1 | 11/2014 | Tachibana et al. | |
| 2014/0366990 A1 | 12/2014 | Lai et al. | |
| 2014/0374645 A1 | 12/2014 | Kikuchi et al. | |
| 2015/0043101 A1 | 2/2015 | Biskeborn et al. | |
| 2015/0098149 A1 | 4/2015 | Bates et al. | |
| 2015/0111066 A1 | 4/2015 | Terakawa et al. | |
| 2015/0123026 A1 | 5/2015 | Masada et al. | |
| 2015/0302879 A1 | 10/2015 | Holmberg et al. | |
| 2015/0380036 A1 | 12/2015 | Kasada et al. | |
| 2016/0061447 A1 | 3/2016 | Kobayashi | |
| 2016/0064025 A1 | 3/2016 | Kurokawa et al. | |
| 2016/0092315 A1* | 3/2016 | Ashida | G06F 11/1469 707/684 |
| 2016/0093321 A1 | 3/2016 | Aoshima et al. | |
| 2016/0093322 A1 | 3/2016 | Kasada et al. | |
| 2016/0093323 A1 | 3/2016 | Omura | |
| 2016/0180875 A1 | 6/2016 | Tanaka et al. | |
| 2016/0189739 A1 | 6/2016 | Kasada et al. | |
| 2016/0189740 A1 | 6/2016 | Oyanagi et al. | |
| 2016/0247530 A1 | 8/2016 | Kasada | |
| 2016/0260449 A1 | 9/2016 | Ahmad et al. | |
| 2016/0276076 A1 | 9/2016 | Kasada | |
| 2017/0032812 A1 | 2/2017 | Kasada | |
| 2017/0053669 A1 | 2/2017 | Kasada | |
| 2017/0053670 A1 | 2/2017 | Oyanagi et al. | |
| 2017/0053671 A1 | 2/2017 | Kasada et al. | |
| 2017/0178675 A1 | 2/2017 | Kasada et al. | |
| 2017/0058227 A1 | 3/2017 | Kondo et al. | |
| 2017/0092315 A1 | 3/2017 | Ozawa et al. | |
| 2017/0130156 A1 | 5/2017 | Kondo et al. | |
| 2017/0178676 A1* | 6/2017 | Kasada | G11B 5/70626 |
| 2017/0178677 A1 | 6/2017 | Kasada | |
| 2017/0186456 A1 | 6/2017 | Tada et al. | |
| 2017/0186460 A1 | 6/2017 | Kasada | |
| 2017/0221513 A1 | 8/2017 | Hiroi et al. | |
| 2017/0221516 A1* | 8/2017 | Oyanagi | G11B 5/70 |
| 2017/0221517 A1 | 8/2017 | Ozawa et al. | |
| 2017/0249963 A1 | 8/2017 | Oyanagi et al. | |
| 2017/0249964 A1 | 8/2017 | Kasada et al. | |
| 2017/0249965 A1 | 8/2017 | Kurokawa et al. | |
| 2017/0249966 A1 | 8/2017 | Tachibana et al. | |
| 2017/0287517 A1 | 10/2017 | Hosoya et al. | |
| 2017/0355022 A1* | 12/2017 | Kaneko | G11B 5/70615 |
| 2017/0358318 A1* | 12/2017 | Kasada | G11B 5/00813 |
| 2017/0372726 A1* | 12/2017 | Kasada | G11B 5/00813 |
| 2017/0372727 A1 | 12/2017 | Kasada et al. | |
| 2017/0372736 A1* | 12/2017 | Kaneko | G11B 5/588 |
| 2017/0372738 A1 | 12/2017 | Kasada | |
| 2017/0372739 A1* | 12/2017 | Ozawa | G11B 5/71 |
| 2017/0372740 A1 | 12/2017 | Ozawa et al. | |
| 2017/0372741 A1 | 12/2017 | Kurokawa et al. | |
| 2017/0372742 A1* | 12/2017 | Kaneko | G11B 5/584 |
| 2017/0372743 A1* | 12/2017 | Kasada | G11B 5/584 |
| 2017/0372744 A1 | 12/2017 | Ozawa et al. | |
| 2018/0061446 A1* | 3/2018 | Kasada | G11B 5/00817 |
| 2018/0061447 A1* | 3/2018 | Kasada | G11B 5/78 |
| 2018/0082710 A1 | 3/2018 | Tada et al. | |
| 2018/0137887 A1 | 5/2018 | Sekiguchi et al. | |
| 2018/0182417 A1 | 6/2018 | Kaneko et al. | |
| 2018/0182422 A1 | 6/2018 | Kawakami et al. | |
| 2018/0182425 A1 | 6/2018 | Kasada et al. | |
| 2018/0182426 A1 | 6/2018 | Ozawa et al. | |
| 2018/0182427 A1 | 6/2018 | Kasada et al. | |
| 2018/0182429 A1 | 6/2018 | Kasada et al. | |
| 2018/0182430 A1 | 6/2018 | Ozawa et al. | |
| 2018/0182428 A1 | 7/2018 | Kasada et al. | |
| 2018/0240475 A1* | 8/2018 | Kasada | G11B 5/70 |
| 2018/0240476 A1* | 8/2018 | Kasada | G11B 5/70 |
| 2018/0240478 A1* | 8/2018 | Kasada | G11B 5/70 |
| 2018/0240479 A1* | 8/2018 | Kasada | G11B 5/00813 |
| 2018/0240481 A1* | 8/2018 | Kasada | G11B 5/584 |
| 2018/0240488 A1 | 8/2018 | Kasada | |
| 2018/0240489 A1* | 8/2018 | Kasada | G11B 5/70 |
| 2018/0240490 A1* | 8/2018 | Kurokawa | G11B 5/70 |
| 2018/0240491 A1* | 8/2018 | Ozawa | G11B 5/00813 |
| 2018/0240492 A1 | 8/2018 | Kasada | |
| 2018/0240493 A1* | 8/2018 | Tada | G11B 5/712 |
| 2018/0240494 A1 | 8/2018 | Kurokawa et al. | |
| 2018/0240495 A1* | 8/2018 | Kasada | G11B 5/712 |
| 2018/0286439 A1 | 10/2018 | Ozawa et al. | |
| 2018/0286442 A1 | 10/2018 | Ozawa et al. | |
| 2018/0286443 A1 | 10/2018 | Ozawa et al. | |
| 2018/0286444 A1 | 10/2018 | Kasada et al. | |
| 2018/0286446 A1 | 10/2018 | Ozawa et al. | |
| 2018/0286447 A1 | 10/2018 | Ozawa et al. | |
| 2018/0286448 A1 | 10/2018 | Ozawa et al. | |
| 2018/0286449 A1 | 10/2018 | Kasada et al. | |
| 2018/0286450 A1 | 10/2018 | Kasada et al. | |
| 2018/0286451 A1 | 10/2018 | Ozawa et al. | |
| 2018/0286452 A1 | 10/2018 | Ozawa et al. | |
| 2018/0286453 A1 | 10/2018 | Kasada et al. | |
| 2018/0301165 A1* | 10/2018 | Oyanagi | G11B 5/70 |
| 2018/0350398 A1 | 12/2018 | Kawakami et al. | |
| 2018/0350400 A1 | 12/2018 | Kaneko et al. | |
| 2018/0358042 A1 | 12/2018 | Kasada et al. | |
| 2018/0374507 A1 | 12/2018 | Kasada | |
| 2019/0027167 A1 | 1/2019 | Tada et al. | |
| 2019/0027168 A1* | 1/2019 | Kasada | G11B 5/00813 |
| 2019/0027171 A1 | 1/2019 | Kasada | |
| 2019/0027172 A1 | 1/2019 | Kasada | |
| 2019/0027174 A1* | 1/2019 | Tada | G11B 5/66 |
| 2019/0027175 A1 | 1/2019 | Kurokawa et al. | |
| 2019/0027176 A1 | 1/2019 | Kurokawa et al. | |
| 2019/0027177 A1 | 1/2019 | Kasada | |
| 2019/0027178 A1 | 1/2019 | Kasada | |
| 2019/0027179 A1 | 1/2019 | Ozawa et al. | |
| 2019/0027180 A1 | 1/2019 | Kasada et al. | |
| 2019/0027181 A1 | 1/2019 | Ozawa et al. | |
| 2019/0035424 A1 | 1/2019 | Endo | |
| 2019/0051325 A1 | 2/2019 | Kasada et al. | |
| 2019/0088278 A1 | 3/2019 | Kasada et al. | |
| 2019/0096437 A1 | 3/2019 | Ozawa et al. | |
| 2019/0103130 A1* | 4/2019 | Kasada | G11B 5/00813 |
| 2019/0103131 A1* | 4/2019 | Kasada | G11B 5/00813 |
| 2019/0103133 A1 | 4/2019 | Ozawa et al. | |
| 2019/0103134 A1 | 4/2019 | Kasada et al. | |
| 2019/0103135 A1 | 4/2019 | Ozawa et al. | |

(56) References Cited

U.S. PATENT DOCUMENTS

| | | | |
|---|---|---|---|
| 2019/0130936 A1 | 5/2019 | Kaneko et al. | |
| 2019/0295590 A1 | 9/2019 | Kaneko et al. | |

FOREIGN PATENT DOCUMENTS

| | | | | |
|---|---|---|---|---|
| JP | 61-11924 | A | | 1/1986 |
| JP | 61-139932 | A | | 6/1986 |
| JP | 61139923 | A | * | 6/1986 |
| JP | 63-129519 | A | | 6/1988 |
| JP | 63249932 | A | | 10/1988 |
| JP | 64-57422 | A | | 3/1989 |
| JP | 6460819 | A | | 3/1989 |
| JP | 5-258283 | A | | 10/1993 |
| JP | 5-298653 | A | | 11/1993 |
| JP | 7-57242 | A | | 3/1995 |
| JP | 11-110743 | A | | 4/1999 |
| JP | 11-175949 | A | | 7/1999 |
| JP | 11-273051 | A | | 10/1999 |
| JP | 2000-251240 | A | | 9/2000 |
| JP | 2002-157726 | A | | 5/2002 |
| JP | 2002-329605 | A | | 11/2002 |
| JP | 2002-367142 | A | | 12/2002 |
| JP | 2002367318 | A | * | 12/2002 |
| JP | 2003-77116 | A | | 3/2003 |
| JP | 2003-323710 | A | | 11/2003 |
| JP | 2004-005820 | A | | 1/2004 |
| JP | 2004-114492 | A | | 4/2004 |
| JP | 2004-133997 | A | | 4/2004 |
| JP | 2004-185676 | A | | 7/2004 |
| JP | 2005-38579 | A | | 2/2005 |
| JP | 2005-092967 | A | | 4/2005 |
| JP | 2005-243063 | A | | 9/2005 |
| JP | 2005-243162 | A | | 9/2005 |
| JP | 2006-92672 | A | | 4/2006 |
| JP | 2006-286114 | A | | 10/2006 |
| JP | 2007-265555 | A | | 10/2007 |
| JP | 2007-273039 | A | | 10/2007 |
| JP | 2007-287310 | A | | 11/2007 |
| JP | 2007-297427 | A | | 11/2007 |
| JP | 2008-047276 | A | | 2/2008 |
| JP | 2008-243317 | A | | 10/2008 |
| JP | 2009-283082 | A | | 12/2009 |
| JP | 2010-036350 | A | | 2/2010 |
| JP | 2010-049731 | A | | 3/2010 |
| JP | 2011-48878 | A | | 3/2011 |
| JP | 2011-138566 | A | | 7/2011 |
| JP | 2011-210288 | A | | 10/2011 |
| JP | 2011-225417 | A | | 11/2011 |
| JP | 2012-038367 | A | | 2/2012 |
| JP | 2012-043495 | A | | 3/2012 |
| JP | 2012-203955 | A | | 10/2012 |
| JP | 2013-25853 | A | | 2/2013 |
| JP | 2013-77360 | A | | 4/2013 |
| JP | 2013-164889 | A | | 8/2013 |
| JP | 2014-15453 | A | | 1/2014 |
| JP | 2014-179149 | A | | 9/2014 |
| JP | 2015-39801 | A | | 3/2015 |
| JP | 2015-111484 | A | | 6/2015 |
| JP | 2016-15183 | A | | 1/2016 |
| JP | 2016-502224 | A | | 1/2016 |
| JP | 2016-051493 | A | | 4/2016 |
| JP | 2016-71926 | A | | 5/2016 |
| JP | 2016-139451 | A | | 8/2016 |

OTHER PUBLICATIONS

English Translation of JP 2002-367318 A (Year: 2002).*
Notice of Allowance dated Jun. 2, 2017, which issued during the prosecution of U.S. Appl. No. 15/218,190.
Notice of Allowance dated Apr. 27, 2017, which issued during the prosecution of U.S. Appl. No. 15/052,115.
Office Action dated May 4, 2018, which issued during the prosecution of U.S. Appl. No. 15/422,821.
Office Action dated May 4, 2018, which issued during the prosecution of U.S. Appl. No. 15/422,944.
Office Action dated May 7, 2018, which issued during the prosecution of U.S. Appl. No. 15/624,897.
Office Action dated May 7, 2018, which issued during the prosecution of U.S. Appl. No. 15/624,792.
Office Action dated May 7, 2018, which issued during the prosecution of U.S. Appl. No. 15/626,832.
Office Action dated May 2, 2018, which issued during the prosecution of U.S. Appl. No. 15/280,195.
Notice of Allowance dated Aug. 30, 2017, which issued during the prosecution of U.S. Appl. No. 15/466,143.
Office Action dated May 4, 2018, which issued during the prosecution of U.S. Appl. No. 15/625,428.
Office Action dated Nov. 29, 2018, which issued during the prosecution of U.S. Appl. No. 15/380,309.
Office Action dated Nov. 29, 2018, which issued during the prosecution of U.S. Appl. No. 15/422,821.
Office Action dated Oct. 3, 2018, which issued during the prosecution of U.S. Appl. No. 15/280,195.
Office Action dated Jul. 6, 2018, which issued during the prosecution of U.S. Appl. No. 15/848,173.
Notice of Allowance dated Oct. 11, 2018, which issued during the prosecution of U.S. Appl. No. 15/422,944.
Notice of Allowance dated Oct. 11, 2018, which issued during the prosecution of U.S. Appl. No. 15/624,897.
Notice of Allowance dated Oct. 11, 2018, which issued during the prosecution of U.S. Appl. No. 15/624,792.
Notice of Allowance dated Oct. 12, 2018, which issued during the prosecution of U.S. Appl. No. 15/626,832.
Notice of Allowance dated Oct. 11, 2018, which issued during the prosecution of U.S. Appl. No. 15/380,336.
Office Action dated Oct. 9, 2018, which issued during the prosecution of U.S. Appl. No. 15/628,814.
Office Action dated Oct. 22, 2018, which issued during the prosecution of U.S. Appl. No. 15/854,439.
Office Action dated Sep. 24, 2018, which issued during the prosecution of U.S. Appl. No. 15/690,400.
Office Action dated Sep. 27, 2018, which issued during the prosecution of U.S. Appl. No. 15/690,906.
Office Action dated Oct. 12, 2018, which issued during the prosecution of U.S. Appl. No. 15/626,355.
Office Action dated Oct. 12, 2018, which issued during the prosecution of U.S. Appl. No. 15/627,696.
Office Action dated Sep. 27, 2018, which issued during the prosecution of U.S. Appl. No. 15/854,383.
Office Action dated Aug. 10, 2017, which issued during the prosecution of U.S. Appl. No. 14/870,618.
Notice of Allowance dated Feb. 14, 2018, which issued during the prosecution of U.S. Appl. No. 14/870,618.
Office Action dated Sep. 26, 2017 issued by the Japanese Patent Office in JP Appln. No. 2014-265723 corresponding to U.S. Appl. No. 14/870,618.
Office Action dated Sep. 26, 2017 issued by the Japanese Patent Office in JP Appln. No. 2015-249264 corresponding to U.S. Appl. No. 14/870,618.
Notice of Allowance dated Dec. 2, 2016 which issued during the prosecution of U.S. Appl. No. 14/753,227.
Office Action dated Nov. 18, 2016 which issued during the prosecution of U.S. Appl. No. 14/753,227.
Final Office Action dated Aug. 15, 2016 which issued during the prosecution of U.S. Appl. No. 14/753,227.
Office Action dated Feb. 4, 2016 which issued during the prosecution of U.S. Appl. No. 14/753,227.
Notice of Allowance dated Jul. 12, 2017 which issued during the prosecution of U.S. Appl. No. 15/388,864.
Office Action dated Jun. 9, 2017 which issued during the prosecution of U.S. Appl. No. 15/388,864.
Office Action dated Apr. 26, 2017 which issued during the prosecution of U.S. Appl. No. 15/388,864.
Office Action dated Jun. 7, 2018 which issued during the prosecution of U.S. Appl. No. 15/380,309.

(56) References Cited

OTHER PUBLICATIONS

Office Action dated Aug. 3, 2018 which issued during the prosecution of U.S. Appl. No. 15/388,911.
Office Action dated May 30, 2018 which issued during the prosecution of U.S. Appl. No. 15/388,911.
Office Action dated Nov. 16, 2016 which issued during the prosecution of U.S. Appl. No. 15/072,550.
Notice of Allowance dated Apr. 25, 2017 which issued during the prosecution of U.S. Appl. No. 15/072,550.
Notice of Allowance dated May 10, 2018 which issued during the prosecution of U.S. Appl. No. 15/615,871.
Notice of Allowance dated Mar. 16, 2018 which issued during the prosecution of U.S. Appl. No. 15/854,410.
Communication dated Dec. 6, 2016 from the U.S. Patent and Trademark Office in U.S. Appl. No. 14/757,555.
Communication dated Dec. 5, 2016 from the U.S. Patent and Trademark Office in U.S. Appl. No. 14/978,834.
Notice of Allowance dated May 8, 2017, which issued during the prosecution of U.S. Appl. No. 14/757,555.
Notice of Allowance dated May 8, 2017, which issued during the prosecution of U.S. Appl. No. 14/978,834.
Notice of Allowance dated Aug. 28, 2018, which issued during the prosecution of U.S. Appl. No. 15/422,821.
Notice of Allowance dated Sep. 4, 2018, which issued during the prosecution of U.S. Appl. No. 15/625,428.
Communication dated Aug. 3, 2018 from the U.S. Patent and Trademark Office in U.S. Appl. No. 15/380,336.
Communication dated Aug. 23, 2018 from the U.S. Patent and Trademark Office in U.S. Appl. No. 15/614,876.
Communication dated Aug. 24, 2018 from the U.S. Patent and Trademark Office in U.S. Appl. No. 15/620,916.
Communication dated Aug. 23, 2018 from the U.S. Patent and Trademark Office in U.S. Appl. No. 15/621,464.
Communication dated Aug. 23, 2018 from the U.S. Patent and Trademark Office in U.S. Appl. No. 15/626,720.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S. Appl. No. 15/920,533.
Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 20, 2018, which issued during the prosecution of U.S. Appl. No. 15/900,164.
Office Action dated Dec. 21, 2018, which issued during the prosecution of U.S. Appl. No. 15/900,230.
Office Action dated Jul. 3, 2018, which issued during the prosecution of U.S. Appl. No. 15/920,518.
Office Action dated Nov. 28, 2018, which issued during the prosecution of U.S. Appl. No. 15/899,587.
Office Action dated Dec. 25, 2018 in Japanese Application No. 2015-245144.
Office Action dated Dec. 25, 2018 in Japanese Application No. 2015-245145.
Office Action dated Dec. 25, 2018 in Japanese Application No. 2015-254192.
Office Action dated Dec. 31, 2018 in U.S. Appl. No. 16/009,603.
Notice of Allowance dated Aug. 6, 2018, which issued during the prosecution of U.S. Appl. No. 15/920,768.
Notice of Allowance dated Dec. 3, 2018, which issued during the prosecution of U.S. Appl. No. 15/920,518.
Notice of Allowance dated Dec. 4, 2018, which issued during the prosecution of U.S. Appl. No. 15/625,428.
Office Action dated Oct. 5, 2017, which issued during the prosecution of U.S. Appl. No. 15/241,286.
Notice of Allowance dated Mar. 21, 2018, which issued during the prosecution of U.S. Appl. No. 15/241,286.
Office Action dated Oct. 5, 2017, which issued during the prosecution of U.S. Appl. No. 15/241,297.
Office Action dated Oct. 5, 2017, which issued during the prosecution of U.S. Appl. No. 15/241,631.
Office Action dated Oct. 5, 2017, which issued during the prosecution of U.S. Appl. No. 15/378,907.
Notice of Allowance dated Mar. 19, 2018, which issued during the prosecution of U.S. Appl. No. 15/378,907.
Notice of Allowance dated Mar. 27, 2018, which issued during the prosecution of U.S. Appl. No. 15/241,631.
Office Action dated Jan. 27, 2015 from the Japanese Patent Office in Japanese Application No. 2013-053543.
Notice of Allowance dated Mar. 14, 2018, which issued during the prosecution of U.S. Appl. No. 15/854,474.
Office Action dated Sep. 19, 2014, which issued during the prosecution of U.S. Appl. No. 14/209,065.
Office Action dated Mar. 13, 2015, which issued during the prosecution of U.S. Appl. No. 14/209,065.
Office Action dated Jul. 6, 2015, which issued during the prosecution of U.S. Appl. No. 14/209,065.
Office Action dated Sep. 10, 2015, which issued during the prosecution of U.S. Appl. No. 14/209,065.
Office Action dated Mar. 24, 2016, which issued during the prosecution of U.S. Appl. No. 14/209,065.
Notice of Allowance dated Oct. 6, 2016, which issued during the prosecution of U.S. Appl. No. 14/209,065.
Notice of Allowance dated Mar. 21, 2018, which issued during the prosecution of U.S. Appl. No. 15/241,297.
Notice of Allowance dated Jun. 28, 2017, which issued during the prosecution of U.S. Appl. No. 15/464,991.
Office Action dated Nov. 8, 2016 from the Japanese Patent Office in Japanese Application No. 2014-199022.
Office Action dated Feb. 25, 2016, which issued during the prosecution of U.S. Appl. No. 14/867,752.
Office Action dated Oct. 19, 2016, which issued during the prosecution of U.S. Appl. No. 14/867,752.
Office Action dated Mar. 16, 2017, which issued during the prosecution of U.S. Appl. No. 14/867,752.
Office Action dated Sep. 7, 2017, which issued during the prosecution of U.S. Appl. No. 14/867,752.
Office Action dated Jan. 31, 2018, which issued during the prosecution of U.S. Appl. No. 14/867,752.
Notice of Allowance dated Apr. 5, 2018, which issued during the prosecution of U.S. Appl. No. 14/867,752.
Office Action dated Apr. 19, 2018, which issued during the prosecution of U.S. Appl. No. 15/854,438.
Notice of Allowance dated Sep. 24, 2018, which issued during the prosecution of U.S. Appl. No. 15/854,438.
Notice of Allowance dated Jul. 13, 2018, which issued during the prosecution of U.S. Appl. No. 15/920,782.
Notice of Allowance dated Aug. 9, 2018, which issued during the prosecution of U.S. Appl. No. 15/920,563.
Office Action dated Nov. 28, 2018, which issued during the prosecution of U.S. Appl. No. 15/900,144.
Office Action dated Nov. 28, 2018, which issued during the prosecution of U.S. Appl. No. 15/900,080.
Office Action dated Sep. 28, 2018, which issued during the prosecution of U.S. Appl. No. 15/854,409.
Office Action dated Oct. 15, 2018, which issued during the prosecution of U.S. Appl. No. 15/854,403.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance dated Jan. 17, 2019 in U.S. Appl. No. 15/626,720.
Notice of Allowance dated Jan. 30, 2019 in U.S. Appl. No. 15/854,409.
Office Action dated Jan. 10, 2019 in U.S. Appl. No. 15/899,430.
Office Action dated Jan. 29, 2019 in U.S. Appl. No. 15/614,876.
Office Action dated Jan. 30, 2019 in U.S. Appl. No. 15/620,916.
Office Action dated Nov. 14, 2018 in U.S. Appl. No. 16/100,289.
Notice of Allowance dated Apr. 16, 2019 in U.S. Appl. No. 15/625,428.
Notice of Allowance dated Apr. 30, 2019 in U.S. Appl. No. 15/380,309.

(56) References Cited

OTHER PUBLICATIONS

Notice of Allowance dated Mar. 18, 2019 in U.S. Appl. No. 15/628,814.
Notice of Allowance dated May 13, 2019 in U.S. Appl. No. 15/900,379.
Notice of Allowance dated May 14, 2019 in U.S. Appl. No. 15/422,821.
Notice of Allowance dated May 14, 2019 in U.S. Appl. No. 15/900,164.
Notice of Allowance dated May 15, 2019 in U.S. Appl. No. 15/900,106.
Notice of Allowance dated May 15, 2019 in U.S. Appl. No. 15/900,242.
Notice of Allowance dated May 16, 2019 in U.S. Appl. No. 15/614,876.
Notice of Allowance dated May 16, 2019 in U.S. Appl. No. 15/621,464.
Notice of Allowance dated May 24, 2019 in U.S. Appl. No. 15/900,345.
Notice of Allowance dated May 24, 2019 in U.S. Appl. No. 16/143,646.
Notice of Allowance dated May 28, 2019 in U.S. Appl. No. 15/920,616.
Notice of Allowance dated May 29, 2019 in U.S. Appl. No. 15/900,160.
Notice of Allowance dated May 29, 2019 in U.S. Appl. No. 15/900,334.
Notice of Allowance dated May 30, 2019 in U.S. Appl. No. 15/900,230.
Office Action dated Apr. 15, 2019 in U.S. Appl. No. 16/182,083.
Office Action dated Apr. 16, 2019 in U.S. Appl. No. 16/232,165.
Office Action dated Apr. 23, 2019 in Japanese Application No. 2016-169851.
Office Action dated Apr. 23, 2019 in Japanese Application No. 2016-182230.
Office Action dated Apr. 4, 2019 in U.S. Appl. No. 16/184,312.
Office Action dated Feb. 5, 2019 in U.S. Appl. No. 16/038,339.
Office Action dated Mar. 15, 2019 in U.S. Appl. No. 15/280,195.
Notice of Allowance dated Mar. 18, 2019 in U.S. Appl. No. 15/626,355.
Office Action dated Mar. 15, 2019 in U.S. Appl. No. 15/627,696.
Office Action dated Mar. 15, 2019 in U.S. Appl. No. 15/690,906.
Office Action dated Mar. 18, 2019 in U.S. Appl. No. 15/442,961.
Office Action dated Mar. 19, 2019 in Japanese Application No. 2016-116261.
Office Action dated Mar. 19, 2019 in Japanese Application No. 2016-124515.
Office Action dated Mar. 19, 2019 in Japanese Application No. 2016-124529.
Office Action dated Mar. 19, 2019 in Japanese Application No. 2016-124932.
Office Action dated Mar. 19, 2019 in Japanese Application No. 2016-124933.
Office Action dated Mar. 19, 2019 in Japanese Application No. 2016-124935.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
Office Action dated May 23, 2019 in U.S. Appl. No. 15/388,911.
Notice of Allowance dated Jun. 6, 2019 in U.S. Appl. No. 15/854,383.
Office Action dated Jun. 6, 2019 in U.S. Appl. No. 15/899,587.
Office Action dated Jun. 10, 2019 in U.S. Appl. No. 15/920,518.
Notice of Allowance dated Aug. 27, 2018 in U.S. Appl. No. 15/920,635.
Office Action dated Dec. 19, 2018 in U.S. Appl. No. 15/900,345.
Office Action dated Dec. 19, 2018 in U.S. Appl. No. 15/900,379.
Office Action dated Dec. 21, 2018 in U.S. Appl. No. 15/900,160.
Office Action dated Dec. 7, 2018 in U.S. Appl. No. 15/920,592.
Office Action dated Feb. 5, 2019 in Japanese Application No. 2016-117339.
Office Action dated Feb. 5, 2019 in Japanese Application No. 2016-123205.
Office Action dated Feb. 5, 2019 in Japanese Application No. 2016-169871.
Office Action dated Feb. 7, 2019 in U.S. Appl. No. 15/621,464.
Office Action dated Nov. 19, 2018 in U.S. Appl. No. 15/900,141.
Notice of Allowance dated Mar. 5, 2019 in U.S. Appl. No. 16/009,603.
Office Action dated Dec. 20, 2018 in U.S. Appl. No. 15/900,242.
Office Action dated Dec. 21, 2018 in U.S. Appl. No. 15/920,616.
Office Action dated Dec. 27, 2018 in U.S. Appl. No. 15/900,334.
Office Action dated Feb. 21, 2019 in U.S. Appl. No. 15/854,383.
Office Action dated Feb. 26, 2019 in Japanese Application No. 2016-123207.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.
Office Action dated Feb. 26, 2019 in U.S. Appl. No. 15/626,832.
Office Action dated Feb. 28, 2019 in U.S. Appl. No. 15/920,518.
"Introduction to TMR Magnetic Sensors", Anonymous, Mar. 12, 2015, MR Sensor Technology, pp. 1-5 (Year: 2015).
Office Action dated Mar. 5, 2019 in U.S. Appl. No. 15/443,026.
Office Action dated Mar. 6, 2019 in U.S. Appl. No. 15/854,403.
Office Action dated Mar. 7, 2019 in U.S. Appl. No. 15/854,439.
Office Action dated Dec. 20, 2018 in U.S. Appl. No. 15/900,106.
Notice of Allowance dated Mar. 13, 2019 in U.S. Appl. No. 16/100,289.
Notice of Allowance dated Jul. 16, 2019 in U.S. Appl. No. 15/900,144.
Notice of Allowance dated Jul. 31, 2019 in U.S. Appl. No. 16/100,289.
Notice of Allowance dated Jul. 31, 2019 in U.S. Appl. No. 16/143,646.
Notice of Allowance dated Jun. 25, 2019 in U.S. Appl. No. 15/620,916.
Notice of Allowance dated Jun. 27, 2019 in U.S. Appl. No. 15/854,439.
Office Action dated Jul. 16, 2019 in Japanese Application No. 2016-124933.
Office Action dated Jun. 25, 2019 in Japanese Application No. 2015-245144.
Office Action dated Aug. 27, 2019 in Japanese Application No. 2016-254428 Translation; Machine corresponds to U.S. Appl. No. 15/854,403.
Office Action dated Aug. 27, 2019 in Japanese Application No. 2016-254430 Translation; Machine corresponds to U.S. Appl. No. 15/854,409.
Office Action dated Aug. 27, 2019 in Japanese Application No. 2016-254432 Translation; Machine corresponds to U.S. Appl. No. 15/854,397.
Office Action dated Aug. 6, 2019 in Japanese Application No. 2016-254421 Translation; Machine corresponds to U.S. Appl. No. 15/854,383.
Office Action dated Aug. 6, 2019 in Japanese Application No. 2016-254427 Translation; Machine corresponds to U.S. Appl. No. 15/848,173.
Office Action dated Sep. 17, 2019 in Japanese Application No. 2017-029499 Translation; Machine corresponds to U.S. Appl. No. 15/900,106.
Office Action dated Sep. 3, 2019 in Japanese Application No. 2016-254434 Translation, Machine corresponds to U.S. Appl. No. 15/854,329.

* cited by examiner

MAGNETIC TAPE HAVING CONTROLLED SURFACE PROPERTIES OF THE BACK COATING LAYER AND MAGNETIC LAYER

CROSS-REFERENCE TO RELATED APPLICATIONS

This application claims priority under 35 U.S.C. 119 to Japanese Patent Application No. 2016-123207 filed on Jun. 22, 2016. The above application is hereby expressly incorporated by reference, in its entirety.

BACKGROUND OF THE INVENTION

1. Field of the Invention

The present invention relates to a magnetic tape.

2. Description of the Related Art

Magnetic recording media are divided into tape-shaped magnetic recording media and disk-shaped magnetic recording media, and tape-shaped magnetic recording media, that is, magnetic tapes are mainly used for data storage. The recording and reproducing of signals to the magnetic tape are normally performed by causing the magnetic tape to run in a drive and bringing the surface of the magnetic layer of the magnetic tape to come into contact with a magnetic head (hereinafter, also simply referred to as a "head") to slide thereon.

In the field of magnetic recording, the improvement of electromagnetic conversion characteristics is constantly required. In regards to this point, JP2010-49731A, for example, discloses that a magnetic recording medium having excellent electromagnetic conversion characteristics is obtained by improving surface smoothness of a magnetic layer (for example, see paragraphs 0020 and 0178 of JP2010-49731A).

SUMMARY OF THE INVENTION

Increasing surface smoothness of a magnetic layer of a magnetic tape is an effective method for narrowing an interval (spacing) between a surface of a magnetic layer of a magnetic tape and a head to improve electromagnetic conversion characteristics.

As disclosed in the paragraph 0021 of JP2010-49731A, in recent years, a technology of providing a back coating layer on a surface side of a non-magnetic support opposite to a surface side provided with the magnetic layer is widely used.

Meanwhile, data items recorded in a recording medium such as a magnetic tape are referred to as hot data, warm data, and cold data, in accordance with an access frequency (reproduction frequency). The access frequency becomes low in the order of hot data, warm data, and cold data, and the cold data is usually stored as recorded in a recording medium for a long time which is 10 years or longer (for example, several decades). A recording medium for recording and storing such cold data is referred to as a recording medium for archive. It is desired for the recording medium for archive to exhibit excellent electromagnetic conversion characteristics, before and after the long-term storage described above, and when reproducing data recorded in the recording medium.

Along with a significant increase in amount of information and digitalization of various information items of recent years, the amount of cold data recorded and stored in the recording medium for archive is increased, and thus, a demand for the recording medium for archive is increased more and more. Therefore, the inventors have studied the application of a magnetic tape to the recording medium for archive. However, in such studies, it was clear that electromagnetic conversion characteristics were greatly decreased after an acceleration test corresponding to long-term storage, compared to a state before the acceleration test, in a magnetic tape which includes a back coating layer on a surface side of a non-magnetic support opposite to a surface side provided with a magnetic layer and in which surface smoothness of the surface of the magnetic layer is increased for the improvement of the electromagnetic conversion characteristics.

Therefore, an object of the invention is to provide a magnetic tape suitable as a recording medium for archive, which includes a back coating layer on a surface side of a non-magnetic support opposite to a surface side provided with a magnetic layer and can exhibit excellent electromagnetic conversion characteristics before and after long-term storage.

The inventors have done intensive studies for achieving the object described above, and as a result, the following magnetic tape was newly found. Provided is a magnetic tape comprising: a non-magnetic support; a magnetic layer including ferromagnetic powder and a binder on one surface side of the non-magnetic support; and a back coating layer including non-magnetic powder and a binder on the other surface side of the non-magnetic support, in which a center line average surface roughness Ra (hereinafter, also referred to as a "magnetic layer side Ra") measured regarding the surface of the magnetic layer is equal to or smaller than 1.8 nm, logarithmic decrement (hereinafter, also referred to as a "magnetic layer side logarithmic decrement" or "logarithmic decrement") acquired by a pendulum viscoelasticity test performed regarding the surface of the magnetic layer is equal to or smaller than 0.050, the back coating layer includes one or more components selected from the group consisting of fatty acid and fatty acid amide, and a C—H derived C concentration (hereinafter, also referred to as a "back coating layer side C—H derived C concentration" or a "C—H derived C concentration") calculated from a C—H peak area ratio of C1s spectra obtained by X-ray photoelectron spectroscopic analysis performed regarding a surface of the back coating layer at a photoelectron take-off angle of 10 degrees is equal to or greater than 35 atom %. The magnetic tape described above can exhibit excellent electromagnetic conversion characteristics before and after long-term storage corresponding to data storage of a recording medium for archive. The surmise of the inventors regarding this point will be described later.

In one aspect, the logarithmic decrement is 0.010 to 0.050.

In one aspect, the logarithmic decrement is 0.010 to 0.035.

In one aspect, the C—H derived C concentration is 35 atom % to 60 atom %.

In one aspect, the magnetic layer side Ra is 1.2 nm to 1.8 nm.

In one aspect, the magnetic tape includes a non-magnetic layer including non-magnetic powder and a binder between the non-magnetic support and the magnetic layer.

According to one aspect of the invention, it is possible to provide a magnetic tape suitable as a recording medium for archive, which includes a back coating layer on a surface side of a non-magnetic support opposite to a surface side provided with a magnetic layer and can exhibit excellent electromagnetic conversion characteristics before and after long-term storage.

DESCRIPTION OF THE PREFERRED EMBODIMENTS

Figure 1:
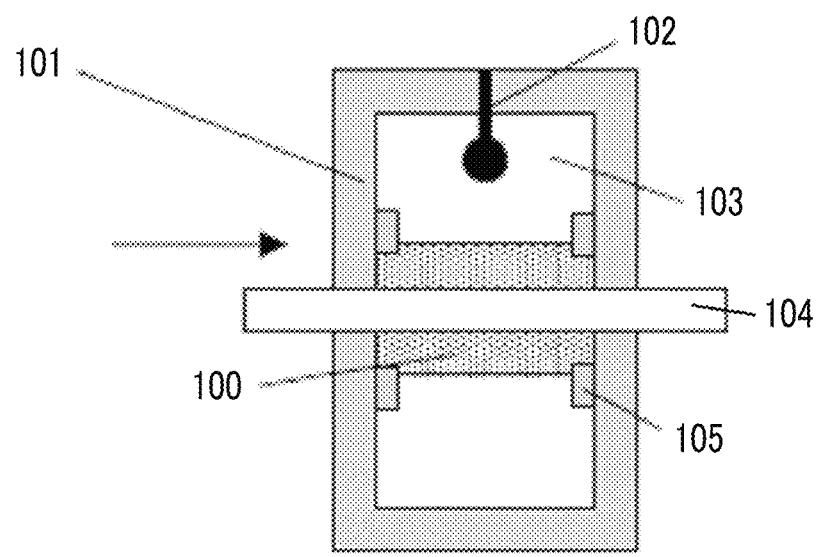
FIG. 1 is an explanatory diagram of a measurement method of logarithmic decrement.

In an aspect of the invention, there is provided a magnetic tape comprising a non-magnetic support; a magnetic layer including ferromagnetic powder and a binder on one surface side of the non-magnetic support; and a back coating layer including non-magnetic powder and a binder on the other surface side, in which a center line average surface roughness Ra measured regarding the surface of the magnetic layer is equal to or smaller than 1.8 nm, logarithmic decrement acquired by a pendulum viscoelasticity test performed regarding the surface of the magnetic layer is equal to or smaller than 0.050, the back coating layer includes one or more components selected from the group consisting of fatty acid and fatty acid amide, and a C—H derived C concentration calculated from a C—H peak area ratio of C1s spectra obtained by X-ray photoelectron spectroscopic analysis performed regarding a surface of the back coating layer at a photoelectron take-off angle of 10 degrees is equal to or greater than 35 atom %.

Hereinafter, the magnetic tape will be described more specifically. The following description contains surmise of the inventors. The invention is not limited by such surmise. In addition, hereinafter, the examples are described with reference to the drawings. However, the invention is not limited to such exemplified aspects.

Magnetic Layer Side Ra

The center line average surface roughness Ra measured regarding the surface of the magnetic layer (magnetic layer side Ra) of the magnetic tape is equal to or smaller than 1.8 nm. Accordingly, the magnetic tape can exhibit excellent electromagnetic conversion characteristics. In order to obtain excellent electromagnetic conversion characteristics before and after long-term storage, the magnetic layer side logarithmic decrement and the back coating layer side C—H derived C concentration of the magnetic tape are respectively set to be in the ranges described above. Details of this point will be described later. From a viewpoint of further improving the electromagnetic conversion characteristics, the magnetic tape surface roughness Ra is preferably equal to or smaller than 1.7 nm, even more preferably equal to or smaller than 1.6 nm, and still more preferably equal to or smaller than 1.5 nm. In addition, the magnetic layer side Ra can be, for example, equal to or greater than 1.2 nm or equal to or greater than 1.3 nm. However, it is preferable that the magnetic layer side Ra is low, from a viewpoint of the improvement of the electromagnetic conversion characteristics, and accordingly, the magnetic layer side Ra may be smaller than the exemplified range.

In the invention and the specification, the center line average surface roughness Ra (hereinafter, also referred to as a "magnetic layer side Ra") measured regarding the surface of the magnetic layer of the magnetic tape is a value measured with an atomic force microscope (AFM) in a region having an area of 40 μm×40 μm. As an example of the measurement conditions, the following measurement conditions can be used. The center line average surface roughness Ra shown in examples which will be described later is a value obtained by the measurement under the following measurement conditions. In the invention and the specification, the "surface of the magnetic layer" of the magnetic tape is identical to the surface of the magnetic tape on the magnetic layer side. In addition, the "surface of the back coating layer" of the magnetic tape is identical to the surface of the magnetic tape on the back coating layer side.

The measurement is performed regarding the region of 40 μm×40 μm of the area of the surface of the magnetic layer of the magnetic tape with an AFM (Nanoscope 4 manufactured by Veeco Instruments, Inc.). A scan speed (probe movement speed) is set as 40 μm/sec and a resolution is set as 512 pixel×512 pixel.

The magnetic layer side Ra can be controlled by a well-known method. For example, the magnetic layer side Ra can be changed in accordance with a size of various powder (for example, ferromagnetic powder, non-magnetic filler which may be arbitrarily included in the magnetic layer, and the like) included in the magnetic layer or manufacturing conditions of the magnetic tape, and thus, by adjusting these, it is possible to obtain a magnetic tape having the magnetic layer side Ra equal to or smaller than 1.8 nm.

The inventors have thought that setting of the magnetic layer side Ra equal to or smaller than 1.8 nm is effective for improving electromagnetic conversion characteristics, but this causes deterioration of electromagnetic conversion characteristics after long-term storage. The reason thereof is specifically as follows.

The magnetic tape is accommodated in a magnetic tape cartridge in a state of being wound around a reel. The recording of data (magnetic signals) to the magnetic tape is performed by setting a magnetic tape cartridge in a drive, causing the magnetic tape to run in the magnetic tape cartridge, and bringing the surface of the magnetic layer of the magnetic tape to come into contact with a magnetic head to slide thereon. The magnetic tape in which cold data is recorded is wound around the reel again and accommodated in the magnetic tape cartridge, after the recording is performed as described above, and then, the magnetic tape is stored in this state for a long time, for example, 10 years or longer. During the long-term storage, in the magnetic tape in a state of being wound around the reel, the surface of the magnetic layer comes into contact with the surface of the back coating layer. This storage period is a much longer period than a period for which data is stored in a recording medium for normal data back-up. When the surface of the magnetic layer comes into contact with the surface of the back coating layer for such an extremely long period, the state of the surface of the magnetic layer may be changed due to the effect of the back coating layer. The inventors have surmised that the change of the state of the surface of the magnetic layer caused by the effect of the back coating layer may be caused by transfer of the shape of the surface of the back coating layer to the surface of the magnetic layer, for example. However, this is merely a surmise, and the details thereof are not clear. The inventors have thought that the change of the state of the surface of the magnetic layer occurring as described above causes deterioration of electromagnetic conversion characteristics after long-term storage.

In regards to this point, the inventors have considered a decrease in adhesiveness between the surface of the magnetic layer and the surface of the back coating layer during the long-term storage. The inventors have thought that, when the adhesiveness is decreased, the effect of the back coating layer affected to the state of the surface of the magnetic layer can be reduced, and as a result, it is possible to prevent deterioration of electromagnetic conversion characteristics after long-term storage. As a result of further intensive studies, it is possible to prevent deterioration of electromagnetic conversion characteristics after long-term storage in the magnetic tape having the magnetic layer side Ra equal to or smaller than 1.8 nm and including the back coating layer on a surface side of the non-magnetic support opposite to a surface side provided with the magnetic layer, by setting the magnetic layer side logarithmic decrement and the back coating layer side C—H derived C concentration to be in the ranges.

Hereinafter, the magnetic layer side logarithmic decrement and the back coating layer side C—H derived C concentration will be further described.

Magnetic Layer Side Logarithmic Decrement

The logarithmic decrement acquired by a pendulum viscoelasticity test performed regarding the surface of the magnetic layer of the magnetic tape is equal to or smaller than 0.050. The inventors have surmised that this contributes to that the magnetic tape having the magnetic layer side Ra equal to or smaller than 1.8 nm and including the back coating layer on a surface side of the non-magnetic support opposite to a surface side provided with the magnetic layer exhibits excellent electromagnetic conversion characteristics before and after long-term storage, and specifically, contributes to the prevention of deterioration of electromagnetic conversion characteristics after long-term storage. From a viewpoint of further preventing the deterioration of electromagnetic conversion characteristics after long-term storage, the magnetic layer side logarithmic decrement is preferably equal to or smaller than 0.045, more preferably equal to or smaller than 0.040, and even more preferably equal to or smaller than 0.035. Meanwhile, it is preferable that the magnetic layer side logarithmic decrement is low, from a viewpoint of preventing the deterioration of electromagnetic conversion characteristics after long-term storage, and therefore, the lower limit value is not particularly limited. The magnetic layer side logarithmic decrement can be, for example, equal to or greater than 0.010 or equal to or greater than 0.015. However, the logarithmic decrement may be smaller than the exemplified value. A specific aspect of a method for adjusting the logarithmic decrement will be described later.

In the invention and the specification, the magnetic layer side logarithmic decrement is a value acquired by the following method.

Figure 2:
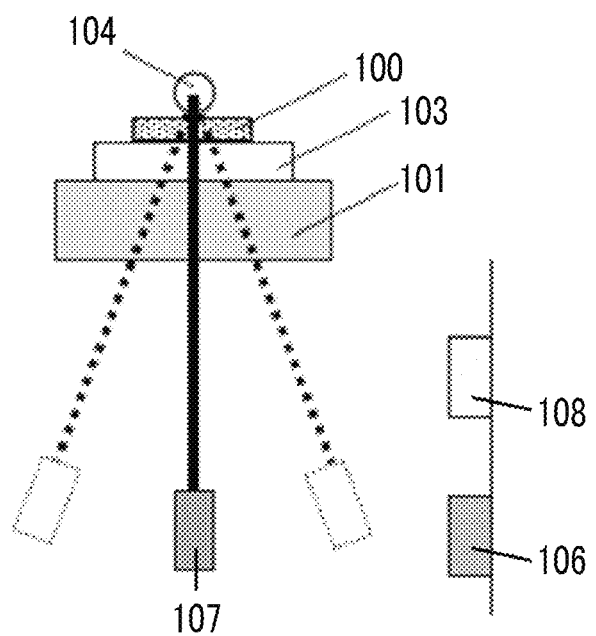
FIG. 2 is an explanatory diagram of a measurement method of logarithmic decrement.
Figure 3:
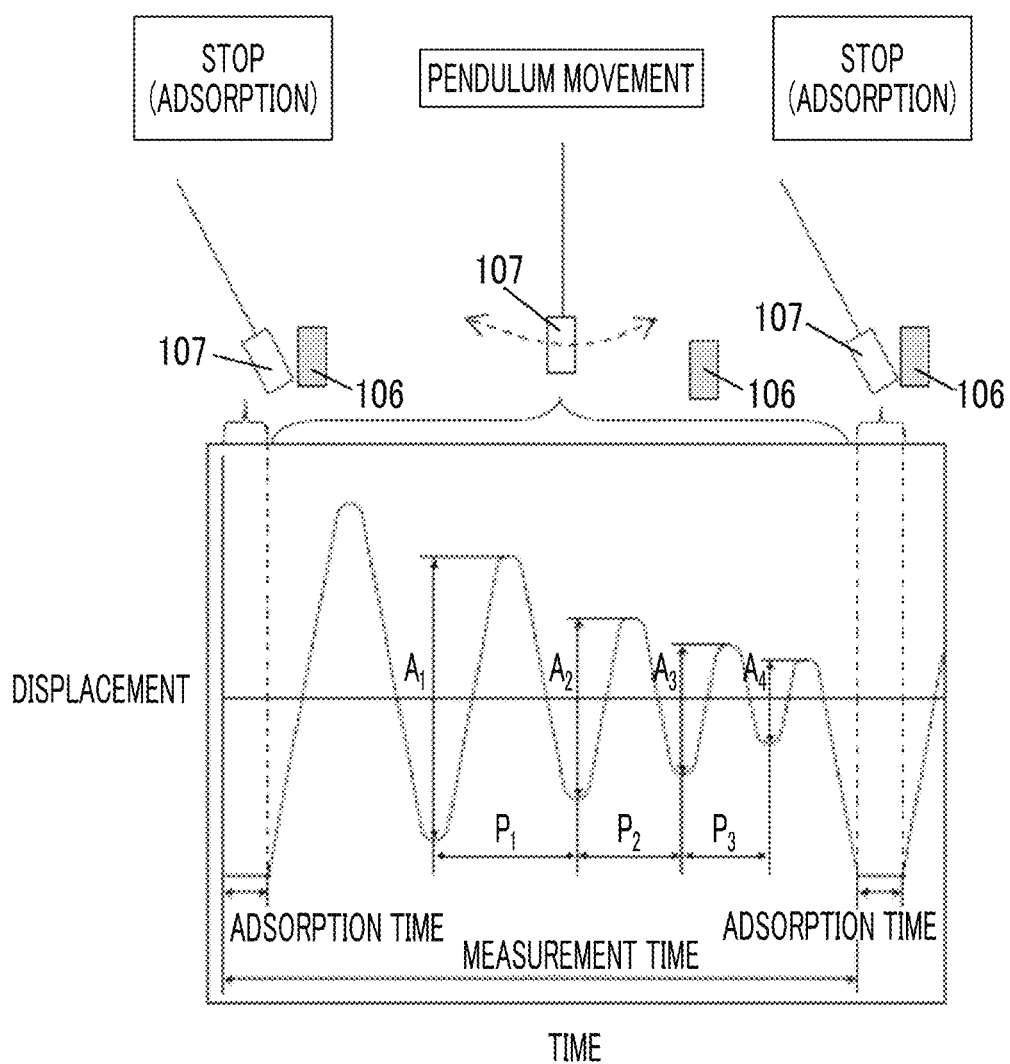
FIG. 3 is an explanatory diagram of a measurement method of logarithmic decrement.

FIG. 1 to FIG. 3 are explanatory diagrams of a measurement method of the logarithmic decrement. Hereinafter, the measurement method of the logarithmic decrement will be described with reference to the drawings. However, the aspect shown in the drawing is merely an example and the invention is not limited thereto.

A measurement sample 100 is cut out from the magnetic tape which is a measurement target. The cut-out measurement sample 100 is placed on a substrate 103 so that a measurement surface (surface of the magnetic layer) faces upwards, in a sample stage 101 in a pendulum viscoelasticity tester, and the measurement sample is fixed by fixing tapes 105 in a state where obvious wrinkles which can be visually confirmed are not generated.

A pendulum-attached columnar cylinder edge 104 (diameter of 4 mm) having mass of 13 g is loaded on the measurement surface of the measurement sample 100 so that a long axis direction of the cylinder edge becomes parallel to a longitudinal direction of the measurement sample 100. An example of a state in which the pendulum-attached columnar cylinder edge 104 is loaded on the measurement surface of the measurement sample 100 as described above (state seen from the top) is shown in FIG. 1. In the aspect shown in FIG. 1, a holder and temperature sensor 102 is installed and a temperature of the surface of the substrate 103 can be monitored. However, this configuration is not essential. In the aspect shown in FIG. 1, the longitudinal direction of the measurement sample 100 is a direction shown with an arrow in the drawing, and is a longitudinal direction of a magnetic tape from which the measurement sample is cut out. In addition, the description regarding angles such as "parallel" in the specification includes a range of errors allowed in the technical field of the invention. For example, this means that the error is in a range within less than ±10° from an exact angle, and the error from the exact angle is preferably equal to or smaller than 5° and more preferably equal to or smaller than 3°. In addition, as a pendulum 107 (see FIG. 2), a pendulum formed of a material having properties of being adsorbed to a magnet such as metal or an alloy is used.

The temperature of the surface of the substrate 103 on which the measurement sample 100 is placed is set to 80° C. by increasing the temperature at a rate of temperature increase equal to or lower than 5° C./min (arbitrary rate of temperature increase may be set, as long as it is equal to or lower than 5° C./min), and the pendulum movement is started (induce initial vibration) by releasing adsorption between the pendulum 107 and a magnet 106. An example of a state of the pendulum 107 which performs the pendulum movement (state seen from the side) is shown in FIG. 2. In the aspect shown in FIG. 2, in the pendulum viscoelasticity tester, the pendulum movement is started by stopping (switching off) the electricity to the magnet (electromagnet) 106 disposed on the lower side of the sample stage to release the adsorption, and the pendulum movement is stopped by restarting (switching on) the electricity to the electromagnet to cause the pendulum 107 to be adsorbed to the magnet 106. As shown in FIG. 2, during the pendulum movement, the pendulum 107 reciprocates the amplitude. From a result obtained by monitoring displacement of the pendulum with a displacement sensor 108 while the pendulum reciprocates the amplitude, a displacement-time curve in which a vertical axis indicates the displacement and a horizontal axis indicates the elapsed time is obtained. An example of the displacement-time curve is shown in FIG. 3. FIG. 3 schematically shows correspondence between the state of the pendulum 107 and the displacement-time curve. The rest (adsorption) and the pendulum movement are repeated at a regular measurement interval, the logarithmic decrement Δ (no unit) is acquired from the following Expression by using a displacement-time curve obtained in the measurement interval after 10 minutes or longer (may be arbitrary time, as long as it is 10 minutes or longer) has elapsed, and this value is set as logarithmic decrement of the surface of the magnetic layer of the magnetic tape. The adsorption time of the first adsorption is set as 1 second or longer (may be arbitrary time, as long as it is 1 second or longer), and the interval between the adsorption stop and the adsorption start is set as 6 seconds or longer (may be arbitrary time, as long as it is 6 seconds or longer). The measurement interval is an interval of the time from the adsorption start and the nest adsorption start. In addition, humidity of an environment in which the pendulum movement is performed, may be arbitrary relative humidity, as long as the relative humidity is in a range of 40% to 70%.

$$\Delta = \frac{\ln\left(\frac{A_1}{A_2}\right) + \ln\left(\frac{A_2}{A_3}\right) + \ldots \ln\left(\frac{A_n}{A_{n+1}}\right)}{n}$$

In the displacement-time curve, an interval between a point of the minimum displacement and a point of the next minimum displacement is set as a period of a wave. n indicates the number of waves included in the displacement-time curve in the measurement interval, and An indicates the minimum displacement and maximum displacement of the n-th wave. In FIG. 3, an interval between the minimum displacement of the n-th wave and the next minimum displacement is shown as Pn (for example, $P_1$ regarding the first wave, $P_2$ regarding the second wave, and $P_3$ regarding the third wave). In the calculation of the logarithmic decrement, a difference (in Expression $A_{n+1}$, in the displacement-time curve shown in FIG. 3, $A_4$) between the minimum displacement and the maximum displacement appearing after the n-th wave is also used, but a part where the pendulum 107 stops (adsorption) after the maximum displacement is not used in the counting of the number of waves. In addition, a part where the pendulum 107 stops (adsorption) before the maximum displacement is not used in the counting of the number of waves, either. Accordingly, the number of waves is 3 (n=3) in the displacement-time curve shown in FIG. 3. The logarithmic decrement of the invention and the specification is a value measured regarding a magnetic tape in which long-term storage corresponding to data storage of a recording medium for archive or an acceleration test corresponding to such long-term storage is not performed. The same applies to the magnetic layer side Ra and the back coating layer side C—H derived C concentration.

In regards to the logarithmic decrement, the inventors have considered as follows. However, the following description is merely a surmise and the invention is not limited thereto.

The inventors have surmised that a viscous component separated from the surface of the magnetic layer during the long-term storage affects adhesiveness between the surface of the magnetic layer and the surface of the back coating layer. Specifically, the inventors have surmised that, as the amount of the viscous component is great, the adhesiveness between the surface of the magnetic layer and the surface of the back coating layer is increased, and as the amount of the viscous component is small, the adhesiveness between the surface of the magnetic layer and the surface of the back coating layer is decreased.

In regards to this point described above, the inventors have considered that the logarithmic decrement measured by the method described above is a value which may be an index of the amount of the viscous component separated from the surface of the magnetic layer during the long-term storage. Specifically, the inventors have thought that, as amount of the viscous component is great, the value of the logarithmic decrement is increased, and as the amount of the viscous component is small, the value of the logarithmic decrement is decreased. In addition, the inventors have surmised that setting of the magnetic layer side logarithmic decrement of the magnetic tape to be equal to or smaller than 0.050 contributes the prevention of the deterioration of electromagnetic conversion characteristics after long-term storage. The details of the viscous component are not clear. However, the inventors have surmised that the viscous component may be derived from a resin used as a binder. Specific description is as follows.

As a binder, various resins can be used as will be described later in detail. The resin is a polymer (including a homopolymer or a copolymer) of two or more polymerizable compounds and generally also includes a component having a molecular weight which is smaller than an average molecular weight (hereinafter, referred to as a "binder component having a low molecular weight"). The inventors have surmised that, as a large amount of the binder component having a low molecular weight is separated from the surface of the magnetic layer during the long-term storage, the adhesiveness between the surface of the magnetic layer and the surface of the back coating layer is increased. The inventors have surmised that, the binder component having a low molecular weight may have viscosity and the logarithmic decrement acquired by the method described above may be an index of the amount of the viscous component separated from the surface of the magnetic layer during the long-term storage. In one aspect, the magnetic layer is formed by applying a magnetic layer forming composition including a curing agent in addition to ferromagnetic powder and a binder onto a non-magnetic support directly or with another layer interposed therebetween, and performing curing process. With the curing process here, it is possible to allow a curing reaction (crosslinking reaction) between the binder and the curing agent. However, the reason thereof is not clear, and the inventors have thought that the binder component having a low molecular weight may have poor reactivity regarding the curing reaction. Accordingly, the inventors have surmised that the binder component having a low molecular which hardly remains in the magnetic layer and is easily separated from the magnetic layer may be one of reasons for that the binder component having a low molecular is easily separated from the surface of the magnetic layer during the long-term storage.

However, the above-mentioned description is merely a surmise of the inventors and the invention is not limited thereto.

Back Coating Layer Side C—H Derived C Concentration

A C—H derived C concentration (back coating layer side C—H derived C concentration) calculated from a C—H peak area ratio of C1s spectra obtained by X-ray photoelectron spectroscopic analysis performed regarding the surface of the back coating layer of the magnetic tape at a photoelectron take-off angle of 10 degrees is equal to or greater than 35 atom %. The inventors have surmised that this also contributes to that the magnetic tape having the magnetic layer side Ra equal to or smaller than 1.8 nm and including the back coating layer on a surface side of the non-magnetic support opposite to a surface side provided with the magnetic layer exhibits excellent electromagnetic conversion characteristics before and after long-term storage, and specifically, contributes to the prevention of deterioration of electromagnetic conversion characteristics after long-term storage. From a viewpoint of further preventing the deterioration of electromagnetic conversion characteristics after long-term storage, the back coating layer side C—H derived C concentration is preferably equal to or greater than 40 atom %, more preferably equal to or greater than 45 atom %, and even more preferably equal to or greater than 50 atom %. Meanwhile, it is preferable that the back coating layer side C—H derived C concentration is high, from a viewpoint of preventing the deterioration of electromagnetic conversion characteristics after long-term storage, and therefore, the upper limit value is not particularly limited. The back coating layer side C—H derived C concentration can be, for example, equal to or smaller than 70 atom % or equal to or smaller than 60 atom %. However, the back coating layer side C—H derived C concentration may be greater than the exemplified value. A specific aspect of a method for adjusting the back coating layer side C—H derived C concentration will be described later.

The back coating layer side C—H derived C concentration is acquired by performing X-ray photoelectron spectroscopic analysis. The X-ray photoelectron spectroscopic analysis is an analysis method also generally called Electron Spectroscopy for Chemical Analysis (ESCA) or X-ray Photoelectron Spectroscopy (XPS). Hereinafter, the X-ray photoelectron spectroscopic analysis is also referred to as ESCA. The ESCA is an analysis method using a phenomenon of photoelectron emission when a surface of a measurement target sample is irradiated with X-ray, and is widely used as an analysis method regarding a surface layer part of a measurement target sample. According to the ESCA, it is possible to perform qualitative analysis and quantitative analysis by using X-ray photoemission spectra acquired by the analysis regarding the sample surface of the measurement target. A depth from the sample surface to the analysis position (hereinafter, also referred to as a "detection depth") and photoelectron take-off angle generally satisfy the following expression: detection depth ≈mean free path of electrons×3×sinθ. In the expression, the detection depth is a depth where 95% of photoelectrons configuring X-ray photoemission spectra are generated, and θ is the photoelectron take-off angle. From the expression described above, it is found that, as the photoelectron take-off angle decreases, the analysis regarding a shallow part of the depth from the sample surface can be performed, and as the photoelectron take-off angle increases, the analysis regarding a deep part of the depth from the sample surface can be performed. In the analysis performed by the ESCA at a photoelectron take-off angle of 10 degrees, an extremely outermost surface part having a depth of approximately several nm from the sample surface generally becomes an analysis position. Accordingly, in the surface of the back coating layer of the magnetic tape, according to the analysis performed by the ESCA at a photoelectron take-off angle of 10 degrees, it is possible to perform composition analysis regarding the extremely outermost surface part having a depth of approximately several nm from the surface of the back coating layer.

The C—H derived C concentration is a percentage of carbon atoms C configuring the C—H bond occupying total (based on atom) 100 atom % of all elements detected by the qualitative analysis performed by the ESCA. The magnetic tape includes one or more components selected from the group consisting of fatty acid and fatty acid amide in the back coating layer. The inventors have considered that, in the surface of the back coating layer of the magnetic tape including one or more of these components in the back coating layer, the C—H derived C concentration obtained by the analysis performed by the ESCA at a photoelectron take-off angle of 10 degrees becomes an index of the presence amount of the components (one or more components selected from the group consisting of fatty acid and fatty acid amide) in the extremely outermost surface part of the back coating layer. Specific description is as follows.

In X-ray photoemission spectra (horizontal axis: bonding energy, vertical axis: strength) obtained by the analysis performed by the ESCA, the C1s spectra include information regarding an energy peak of a 1 s orbit of the carbon atoms C. In such C1s spectra, a peak positioned at the vicinity of the bonding energy 284.6 eV is a C—H peak. This C—H peak is a peak derived from the bonding energy of the C—H bond of the organic compound. The inventors have surmised that, in the extremely outermost surface part of the back coating layer including one or more components selected from the group consisting of fatty acid and fatty acid amide, main constituent components of the C—H peak are components selected from the group consisting of fatty acid and fatty acid amide. Accordingly, the inventors have considered that the C—H derived C concentration can be used as an index of the presence amount as described above. Specifically, the inventor have considered that, as the amount of the component selected from the group consisting of fatty acid and fatty acid amide present in the extremely outermost surface part of the back coating layer is great, the value of the back coating layer side C—H derived C concentration is increased, and as the amount thereof is small, the value of the back coating layer side C—H derived C concentration is decreased. The inventors have considered that allowing a large amount of the component selected from the group consisting of fatty acid and fatty acid amide to be present in the extremely outermost surface part of the back coating layer is effective for decreasing the adhesiveness between the surface of the magnetic layer and the surface of the back coating layer during the long-term storage. Accordingly, the inventors have surmised that, it is possible to decrease a surface free energy of the back coating layer, and as a result, it is possible to decrease the adhesiveness between the surface of the magnetic layer and the surface of the back coating layer during the long-term storage. In addition, the inventors have surmised that setting the back coating layer side C—H derived C concentration of the magnetic tape to be equal to or greater than 35 atom % contributes the prevention of the deterioration of the electromagnetic conversion characteristics after long-term storage.

As described above, the back coating layer side C—H derived C concentration is a value obtained by analysis using ESCA. A region for the analysis is a region having an area of 300 μm×700 μm at an arbitrary position of the surface of the back coating layer of the magnetic tape. The qualitative analysis is performed by wide scan measurement (pass energy: 160 eV, scan range: 0 to 1,200 eV, energy resolution: 1 eV/step) performed by ESCA. Then, spectra of entirety of elements detected by the qualitative analysis are obtained by narrow scan measurement (pass energy: 80 eV, energy resolution: 0.1 eV, scan range: set for each element so that the entirety of spectra to be measured is included). An atomic concentration (unit: atom %) of each element is calculated from the peak surface area of each spectrum obtained as described above. Here, an atomic concentration (C concentration) of carbon atoms is also calculated from the peak surface area of C1s spectra.

In addition, C1s spectra are obtained (pass energy: 10 eV, scan range: 276 to 296 eV, energy resolution: 0.1 eV/step). The obtained C1s spectra are subjected to a fitting process by a nonlinear least-squares method using a Gauss-Lorentz complex function (Gaussian component: 70%, Lorentz component: 30%), peak resolution of a peak of a C—H bond of the C1s spectra is performed, and a percentage (peak area ratio) of the separated C—H peak occupying the C1s spectra is calculated. A C—H derived C concentration is calculated by multiplying the calculated C—H peak area ratio by the C concentration.

An arithmetical mean of values obtained by performing the above-mentioned process at different positions of the surface of the back coating layer of the magnetic tape three times is set as the back coating layer side C—H derived C concentration. In addition, the specific aspect of the process described above is shown in examples which will be described later.

As preferred means for adjusting the back coating layer side C—H derived C concentration described above to be in the range described above, a cooling step can be performed in a back coating layer forming step which will be described later specifically. However, the magnetic tape is not limited to a magnetic tape manufactured through such a cooling step.

Hereinafter, the magnetic tape described above will be described more specifically.

Magnetic Layer

Ferromagnetic Powder

The magnetic layer includes ferromagnetic powder and a binder. As the ferromagnetic powder, various powders normally used as ferromagnetic powder in the magnetic layer of a magnetic recording medium such as a magnetic tape can be used. It is preferable to use ferromagnetic powder having a small average particle size, from a viewpoint of improvement of recording density of the magnetic tape. From this viewpoint, ferromagnetic powder having an average particle size equal to or smaller than 50 nm is preferably used as the ferromagnetic powder. Meanwhile, the average particle size of the ferromagnetic powder is preferably equal to or greater than 10 nm, from a viewpoint of stability of magnetization.

An average particle sizes of the ferromagnetic powder is a value measured by the following method with a transmission electron microscope.

The ferromagnetic powder is imaged at a magnification ratio of 100,000 with a transmission electron microscope, the image is printed on printing paper so that the total magnification becomes 500,000, to obtain an image of particles configuring the ferromagnetic powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles arbitrarily extracted. An arithmetical mean of the particle size of 500 particles obtained as described above is an average particle size of the ferromagnetic powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss.

In the invention and the specification, the average particle size of the ferromagnetic powder and other powder is an average particle size obtained by the method described above, unless otherwise noted. The average particle size shown in examples which will be described later is measured by using transmission electron microscope H-9000 manufactured by Hitachi, Ltd. as the transmission electron microscope, and image analysis software KS-400 manufactured by Carl Zeiss as the image analysis software.

As a method of collecting a sample powder such as ferromagnetic powder from the magnetic layer in order to measure the particle size, a method disclosed in a paragraph of 0015 of JP2011-048878A can be used, for example.

In the invention and the specification, (1) in a case where the shape of the particle observed in the particle image described above is a needle shape, a fusiform shape, or a columnar shape (here, a height is greater than a maximum long diameter of a bottom surface), the size (hereinafter, referred to as a "particle size") of the particles configuring the powder such as ferromagnetic powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, in a case where the shape of the particle is specified, for example, in a case of definition of the particle size (1), the average particle size is an average long axis length, in a case of the definition (2), the average particle size is an average plate diameter, and an average plate ratio is an arithmetical mean of (maximum long diameter/thickness or height). In a case of the definition (3), the average particle size is an average diameter (also referred to as an average particle diameter).

As a preferred specific example of the ferromagnetic powder, ferromagnetic hexagonal ferrite powder can be used. An average particle size of the ferromagnetic hexagonal ferrite powder (average plate diameter) is preferably 10 nm to 50 nm and more preferably 20 nm to 50 nm, from a viewpoint of realizing high-density recording and stability of magnetization. For details of the ferromagnetic hexagonal ferrite powder, descriptions disclosed in paragraphs 0012 to 0030 of JP2011-225417A, paragraphs 0134 to 0136 of JP2011-216149A, and paragraphs 0013 to 0030 of JP2012-204726A can be referred to, for example.

As a preferred specific example of the ferromagnetic powder, ferromagnetic metal powder can also be used. An average particle size (average long axis length) of the ferromagnetic metal powder is preferably 10 nm to 50 nm and more preferably 20 nm to 50 nm, from a viewpoint of high-density recording and stability of magnetization. For details of the ferromagnetic metal powder, descriptions disclosed in paragraphs 0137 to 0141 of JP2011-216149A and paragraphs 0009 to 0023 of JP2005-251351 can be referred to, for example.

The content (filling percentage) of the ferromagnetic powder of the magnetic layer is preferably in a range of 50 to 90 mass % and more preferably in a range of 60 to 90 mass %. The components other than the ferromagnetic powder of the magnetic layer are at least a binder and one or more kinds of additives may be arbitrarily included. A high filling percentage of the ferromagnetic powder in the magnetic layer is preferable from a viewpoint of improvement recording density.

Binder and Curing Agent

The magnetic tape is a coating type magnetic tape, and the magnetic layer includes a binder together with the ferromagnetic powder. The binder is one or more kinds of resin. As the binder, various resins normally used as a binder of a coating type magnetic recording medium can be used. For example, as the binder, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be a homopolymer or a copolymer. These resins can be used as the binder even in the non-magnetic layer and/or a back coating layer which will be described later. For the binder described above, description disclosed in paragraphs 0028 to 0031 of JP2010-24113A can be referred to. A weight-average molecular weight of the resin used as the binder can be, for example, 10,000 to 200,000 as a weight-average molecular weight. The weight-average molecular weight of the invention and the specification is a value obtained by performing polystyrene conversion of a value measured by gel permeation chromatography (GPC). As the measurement conditions, the following conditions can be used. The weight-average molecular weight shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In addition, a curing agent can also be used together with a resin which can be used as the binder. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binder, by proceeding the curing reaction in the magnetic layer forming step. The preferred curing agent is a thermosetting compound, polyisocyanate is suitable. For the details of polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binder in the magnetic layer forming composition, and is preferably 50.0 to 80.0 parts by mass, from a viewpoint of improvement of strength of each layer such as the magnetic layer.

Additive

The magnetic layer includes the ferromagnetic powder and the binder, and may include one or more kinds of additives, if necessary. As the additives, the curing agent described above is used as an example. In addition, examples of the additive which can be included in the magnetic layer include a non-magnetic filler, a lubricant, a dispersing agent, a dispersing assistant, an antifungal agent, an antistatic agent, an antioxidant, and carbon black. As the additives, a commercially available product can be suitably selected and used according to desired properties. For example, one or more kinds of a well-known lubricant such as fatty acid and fatty acid amide which will be described later can be used as the lubricant.

Hereinafter, a non-magnetic filler which is one aspect of the additive will be described. However, the invention is not limited to the following aspect. The non-magnetic filler is identical to the non-magnetic powder. In addition, in the invention and the specification, the non-magnetic powder means an aggregate of a plurality of non-magnetic particles. The aggregate not only includes an aspect in which particles configuring the aggregate directly come into contact with each other, and also includes an aspect in which a binder and an additive is interposed between the particles. A term "particles" is also used for describing the powder. The same applies to various powders of the invention and the specification.

It is preferable that the magnetic layer includes one kind or two or more kinds of the non-magnetic filler. As the non-magnetic filler, a non-magnetic filler (hereinafter, referred to as a "projection formation agent") which can function as a projection formation agent which forms projections suitably protruded from the surface of the magnetic layer, and a non-magnetic filler (hereinafter, referred to as an "abrasive") which can function as an abrasive can be used. The projection formation agent is a component which can contribute to the control of friction properties of the surface of the magnetic layer. It is preferable that at least one of the projection formation agent and the abrasive is included in the magnetic layer of the magnetic tape, and it is preferable that both of them are included.

As the projection formation agent, various non-magnetic fillers normally used as a projection formation agent can be used. These may be inorganic substances or organic substances. In one aspect, from a viewpoint of homogenization of friction properties, particle size distribution of the projection formation agent is not polydispersion having a plurality of peaks in the distribution and is preferably monodisperse showing a single peak. From a viewpoint of availability of monodisperse particles, the non-magnetic filler is preferably powder of inorganic substances. Examples of the powder of inorganic substances include powder of metal oxide, metal carbonate, metal sulfate, metal nitride, metal carbide, and metal sulfide, and powder of inorganic oxide is preferable. The projection formation agent is more preferably colloidal particles and even more preferably inorganic oxide colloidal particles. In addition, from a viewpoint of availability of monodisperse particles, the inorganic oxide configuring the inorganic oxide colloidal particles are preferably silicon dioxide (silica). The inorganic oxide colloidal particles are more preferably colloidal silica (silica colloidal particles). The average particle size of the colloidal particles is a value obtained by a method disclosed in a paragraph 0015 of JP2011-048878A as a measurement method of an average particle diameter. In addition, in another aspect, the projection formation agent is preferably carbon black.

An average particle size of the projection formation agent is, for example, 30 to 300 nm and is preferably 40 to 200 nm.

Meanwhile, as the abrasive, powders of alumina ($Al_2O_3$), silicon carbide, boron carbide ($B_4C$), $SiO_2$, TiC chromium oxide ($Cr_2O_3$), cerium oxide, zirconium oxide ($ZrO_2$), iron oxide, diamond, and the like which are substances normally used as the abrasive of the magnetic layer can be used, and among these, alumina powder such as α-alumina and silicon carbide powder are preferable. In addition, regarding the particle size of the abrasive, a specific surface area which is an index of the particle size is, for example, equal to or greater than 14 m²/g, and is preferably 16 m²/g and more preferably 18 m²/g. Further, the specific surface area of the abrasive can be, for example, equal to or smaller than 40 m²/g. The specific surface area is a value obtained by a nitrogen adsorption method (also referred to as a Brunauer-Emmett-Teller BET 1 point method), and is a value measured regarding primary particles. Hereinafter, the specific surface area obtained by such a method is also referred to as a BET specific surface area.

In addition, from a viewpoint that the projection formation agent and the abrasive can exhibit the functions thereof in more excellent manner, the content of the projection formation agent of the magnetic layer is preferably 1.0 to 4.0 parts by mass and more preferably 1.5 to 3.5 parts by mass with respect to 100.0 parts by mass of the ferromagnetic powder. Meanwhile, the content of the abrasive in the magnetic layer is preferably 1.0 to 20.0 parts by mass, more preferably 3.0 to 15.0 parts by mass, and even more preferably 4.0 to 10.0 parts by mass with respect to 100.0 parts by mass of the ferromagnetic powder.

As an example of the additive which can be used in the magnetic layer including the abrasive, a dispersing agent disclosed in paragraphs 0012 to 0022 of JP2013-131285A can be used as a dispersing agent for improving dispersibility of the abrasive.

Non-Magnetic Layer

Next, the non-magnetic layer will be described. The magnetic tape may directly include a magnetic layer on a non-magnetic support, or may include a magnetic layer on a non-magnetic support with at least another layer interposed therebetween. Such another layer is preferably a non-magnetic layer including non-magnetic powder and a binder. The non-magnetic powder used in the non-magnetic layer may be inorganic substances or organic substances. In addition, carbon black and the like can be used. Examples of the inorganic substances include metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113 can be referred to. The content (filling percentage) of the non-magnetic powder of the non-magnetic layer is preferably in a range of 50 to 90 mass % and more preferably in a range of 60 to 90 mass %.

In regards to other details of a binder or additives of the non-magnetic layer, the well-known technology regarding the non-magnetic layer can be applied. In addition, in regards to the type and the content of the binder, and the type and the content of the additive, for example, the well-known technology regarding the magnetic layer can be applied.

The non-magnetic layer of the magnetic tape also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m(100 Oe), or a layer having a residual magnetic flux density equal to or smaller than 10 mT and coercivity equal to or smaller than 7.96 kA/m(100 Oe). It is preferable that the non-magnetic layer does not have a residual magnetic flux density and coercivity.

Back Coating Layer

Fatty Acid and Fatty Acid Amide

The magnetic tape includes one or more components selected from the group consisting of fatty acid and fatty acid amide in the back coating layer. The back coating layer may include only one or both of fatty acid and fatty acid amide. The inventors have considered that presence of a large amount of the components in the extremely outermost surface part of the back coating layer contributes the prevention of deterioration of electromagnetic conversion characteristics after the long-term storage in the magnetic tape as described above.

Examples of fatty acid include lauric acid, myristic acid, palmitic acid, stearic acid, oleic acid, linoleic acid, linolenic acid, behenic acid, erucic acid, and elaidic acid, and stearic acid, myristic acid, and palmitic acid are preferable, and stearic acid is more preferable. Fatty acid may be included in the back coating layer in a state of salt such as metal salt.

As fatty acid amide, amide of various fatty acid, and examples thereof include lauric acid amide, myristic acid amide, palmitic acid amide, and stearic acid amide.

Regarding fatty acid and a derivative of fatty acid (amide and ester which will be described later), a part derived from fatty acid of the fatty acid derivative preferably has a structure which is the same as or similar to that of fatty acid used in combination. As an example, in a case of using stearic acid as fatty acid, it is preferable to use stearic acid amide or stearic acid ester.

The content of fatty acid is, for example, 0.1 to 10.0 parts by mass and preferably 1.0 to 7.0 parts by mass with respect to 100.0 parts by mass of non-magnetic powder included in the back coating layer. In a case where the back coating layer includes two or more kinds of different fatty acids, the content thereof means the total content of the compounds. In the invention and the specification, this point is also applied to the content of other components, unless otherwise noted. In addition, in the invention and the specification, a given component may be used alone or used in combination of two or more kinds thereof, unless otherwise noted.

The content of fatty acid amide in the back coating layer is, for example, 0.1 to 3.0 parts by mass and is preferably 0.1 to 1.0 parts by mass with respect to 100.0 parts by mass of non-magnetic powder included in the back coating layer.

Fatty Acid Ester

Fatty acid and fatty acid amide described above are components which can function as lubricants. Meanwhile, fatty acid ester is also a component which can function as a lubricant. The back coating layer may include or may not include fatty acid ester. Since fatty acid ester is generally called a lubricant which contributes improvement of running durability of a magnetic tape, fatty acid ester may be included in the back coating layer, in order to improve scratch resistance, for example.

As fatty acid ester, ester of various fatty acids described above is used, and examples thereof include butyl myristate, butyl palmitate, butyl stearate (butyl stearate), neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

The content of fatty acid ester is, for example, 0 to 10.0 parts by mass and is preferably 1.0 to 7.0 parts by mass with respect to 100.0 parts by mass of non-magnetic powder included in the back coating layer.

One or more components selected from the group consisting of fatty acid, fatty acid amide, and fatty acid ester described above may be included in a layer other than the back coating layer. For example, one or more components described above may be included in the magnetic layer and/or non-magnetic layer. In regards to the non-magnetic layer, for the content of each component in this case, the content with respect to the non-magnetic powder included in the back coating layer can be applied by being replaced with the content with respect to the non-magnetic powder included in the non-magnetic layer In regards to the magnetic layer, the content with respect to the non-magnetic powder can be applied by being replaced with the content with respect to the ferromagnetic powder.

For the non-magnetic powder of the back coating layer, the description regarding the non-magnetic powder of the non-magnetic layer can be referred to. As the non-magnetic powder of the back coating layer, any one or both of carbon black and non-magnetic powder other than carbon black can be used. It is preferable that carbon black is used or carbon black and non-magnetic powder other than carbon black are used in combination. As the non-magnetic powder other than carbon black, non-magnetic inorganic powder can be used. Specific examples thereof include non-magnetic inorganic powder of iron oxide such as α-iron oxide, titanium oxide such as titanium dioxide, cerium oxide, tin oxide, tungsten oxide, ZnO, $ZrO_2$, $SiO_2$, $Cr_2O_3$, α-alumina, β-alumina, γ-alumina, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide. The preferred non-magnetic inorganic powder is non-magnetic inorganic oxide powder, α-iron oxide and titanium oxide are more preferable, and α-iron oxide is even more preferable.

The shape of the non-magnetic powder other than carbon black may be a shape of any of a needle shape, a sphere shape, a polyhydron shape, and a plate shape. An average particle size of the non-magnetic powder is preferably in a range of 0.005 to 2.00 μm and more preferably in a range of 0.01 to 0.20 μm. In addition, a BET specific surface area of the non-magnetic powder is preferably in a range of 1 to 100 $m^2/g$, more preferably in a range of 5 to 70 $m^2/g$, and even more preferably in a range of 10 to 65 $m^2/g$. Meanwhile, an average particle size of carbon black is, for example, in a range of 5 to 80 nm, preferably in a range of 10 to 50 nm, and more preferably in a range of 10 to 40 nm. For the content (filling percentage) of the non-magnetic powder of the back coating layer, the description regarding the content (filling percentage) of the non-magnetic powder of the non-magnetic layer can be referred to. In addition, the content of carbon black with respect to 100.0 parts by mass of the entire non-magnetic powder can be, for example, in a range of 10.0 to 100.0 parts by mass. The entire non-magnetic powder may be carbon black. In addition, the entire non-magnetic powder may be non-magnetic powder other than carbon black.

Non-Magnetic Support

Next, the non-magnetic support (hereinafter, also simply referred to as a "support") will be described. As the non-magnetic support, well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or thermal treatment may be performed with respect to these supports in advance.

Various Thickness

Regarding thicknesses of the non-magnetic support and each layer of the magnetic tape, a thickness of the non-magnetic support is preferably 3.00 to 6.00 mm and more preferably 3.00 to 4.50 μm.

A thickness of the magnetic layer can be optimized in accordance with saturated magnetization quantity of the magnetic head used, a head gap length, or a band of a recording signal. The thickness of the magnetic layer is normally 10 nm to 150 nm, and is preferably 20 nm to 120 nm and more preferably 30 nm to 100 nm, from a viewpoint of realizing high-density recording. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is the total thickness of the layers.

A thickness of the non-magnetic layer is, for example, 0.01 to 3.00 μm, preferably 0.05 to 2.00 μm, and more preferably 0.05 to 1.50 μm.

A thickness of the back coating layer is preferably equal to or smaller than 0.90 μm and more preferably 0.10 to 0.70 μm.

The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with a scan electron microscope. In the cross section observation, various thicknesses can be acquired as a thickness acquired at one position of the cross section in the thickness direction, or an arithmetical mean of thicknesses acquired at a plurality of positions of two or more positions, for example, two positions which are arbitrarily extracted. In addition, the thickness of each layer may be acquired as a designed thickness calculated according to the manufacturing conditions.

Manufacturing Step

Preparation of Each Layer Forming Composition

Each composition for forming the magnetic layer, the non-magnetic layer, or the back coating layer normally includes a solvent, together with various components described above. As the solvent, various organic solvents generally used for manufacturing a coating type magnetic recording medium can be used. Among those, from a viewpoint of solubility of the binder normally used in the coating type magnetic recording medium, a magnetic layer forming composition preferably includes one or more ketone solvents such as acetone, methyl ethyl ketone, methyl isobutyl ketone, diisobutyl ketone, cyclohexanone, isophorone, and tetrahydrofuran. The amount of the solvent of the magnetic layer forming composition is not particularly limited, and can be set to be the same as that of the magnetic layer forming composition of a typical coating type magnetic recording medium. A percentage of a ketone solvent occupying the entire amount of the solvent included in the magnetic layer forming composition (based on mass) is, for example, equal to or greater than 50 mass %, equal to or greater than 60 mass %, equal to or greater than 70 mass %, equal to or greater than 80 mass %, and equal to or greater than 90 mass %, or may be 100 mass %.

In addition, the description can also be applied to the solvent which may be included in each layer forming composition such as a back coating layer forming composition.

The steps of preparing a composition for forming each layer generally include at least a kneading step, a dispersing step, and a mixing step provided before and after these steps, if necessary. Each step may be divided into two or more stages. All of raw materials used in the invention may be added at an initial stage or in a middle stage of each step. In addition, each raw material may be separately added in two or more steps. In the preparation of the magnetic layer forming composition, it is preferable that the abrasive and the ferromagnetic powder are separately dispersed as described above. In the kneading step, an open kneader, a continuous kneader, a pressure kneader, or a kneader having a strong kneading force such as an extruder is preferably used. The details of the kneading processes of these kneaders are disclosed in JP 1989-106338A (JP-H01-106338A) and JP 1989-79274A (JP-H01-79274A). In addition, in order to disperse each layer forming composition, glass beads and/or other dispersion beads can be used. As such dispersion beads, zirconia beads, titania beads, and steel beads which are dispersion beads having high specific gravity are preferable. These dispersion beads can be used by optimizing a particle diameter (bead diameter) and a filling percentage. As a dispersion device, a well-known dispersion device can be used.

Magnetic Layer Forming Step and Back Coating Layer Forming Step

The magnetic tape can be manufactured by a manufacturing method including at least a magnetic layer forming step and a back coating layer forming step. In the magnetic layer forming step, the magnetic layer can be formed by directly applying the magnetic layer forming composition onto the non-magnetic support or preferably by performing multilayer coating of the magnetic layer forming composition with the non-magnetic layer forming composition in order or at the same time. For details of the coating for forming each layer, a description disclosed in a paragraph 0066 of JP2010-231843A can be referred to.

In a preferred aspect, the magnetic layer forming step can include a coating step of applying a magnetic layer forming composition including ferromagnetic powder, a binder, a curing agent, and a solvent onto a non-magnetic layer directly or with another layer interposed therebetween, to form a coating layer, a heating and drying step of drying the coating layer by a heating process, and a curing step of performing a curing process with respect to the coating layer. The magnetic layer forming step preferably includes a cooling step of cooling the coating layer between the coating step and the heating and drying step, and preferably includes a burnishing treatment step of performing a burnishing treatment with respect to the surface of the coating layer between the heating and drying step and the curing step.

The inventors have thought that it is preferable that the cooling step and the burnishing treatment step in the magnetic layer forming step, in order to set the magnetic layer side logarithmic decrement to be equal to or smaller than 0.050. More specific description is as follows.

The inventors have surmised that performing the cooling step of cooling the coating layer of the magnetic layer forming composition between the coating step and the heating and drying step contributes viscous component separated from the surface of the magnetic layer during the long-term storage localized in the surface and/or a surface layer part in the vicinity of the surface of the coating layer. The inventors have surmised that this is because the viscous component at the time of solvent volatilization in the heating and drying step easily transmits to the surface and/or the surface layer part of the coating layer, by cooling the coating layer before the heating and drying step. However, the reason thereof is not clear. In addition, the inventors have thought that the viscous component can be removed by performing the burnishing treatment with respect to the surface of the coating layer in which the viscous component is localized on the surface and/or surface layer part. The inventors have surmised that performing the curing step after removing the viscous component contributes setting the logarithmic decrement to be equal to or smaller than 0.050. However, this is merely a surmise, and the invention is not limited thereto.

Meanwhile, the back coating layer is formed on a surface of the non-magnetic support opposite to the surface where the magnetic layer is formed (or is to be formed). The back coating layer can be preferably formed through a coating step of applying a back coating layer forming composition onto a surface of a non-magnetic support to form a coating layer, and a heating and drying step of drying the formed coating layer by a heating process. It is preferable that the coating step of forming the back coating layer is performed by using the back coating layer forming composition including one or more components selected from the group consisting of fatty acid and fatty acid amide, and the cooling step of cooling the coating layer of the back coating layer forming composition is performed between the coating step and the heating and drying step, in order to adjust the back coating layer side C—H derived C concentration to be equal to or greater than 35 atom %, in the magnetic tape including the back coating layer including one or more components selected from the group consisting of fatty acid and fatty acid amide. The inventors have surmised that this is because the component (fatty acid and/or fatty acid amide) at the time of solvent volatilization in the heating and drying step easily transmits to the surface of the back coating layer, by cooling the coating layer of the back coating layer forming composition before the heating and drying step. However, this is merely a surmise, and the invention is not limited thereto.

It is preferable that the back coating layer forming step further includes a coating step of applying a back coating layer forming composition including one or more components selected from the group consisting of fatty acid and fatty acid amide, non-magnetic powder, a binder, and a solvent onto a surface of a non-magnetic support to form a coating layer, a heating and drying step of drying the coating layer by a heating process, and a cooling step of cooling the coating layer between the coating step and the heating and drying step.

Specific Aspect of Manufacturing Method of Magnetic Tape

Hereinafter, as an example, a specific aspect of the manufacturing method of the magnetic tape will be described with reference to FIG. 4. However, the invention is not limited to the following specific aspect.

Figure 4:
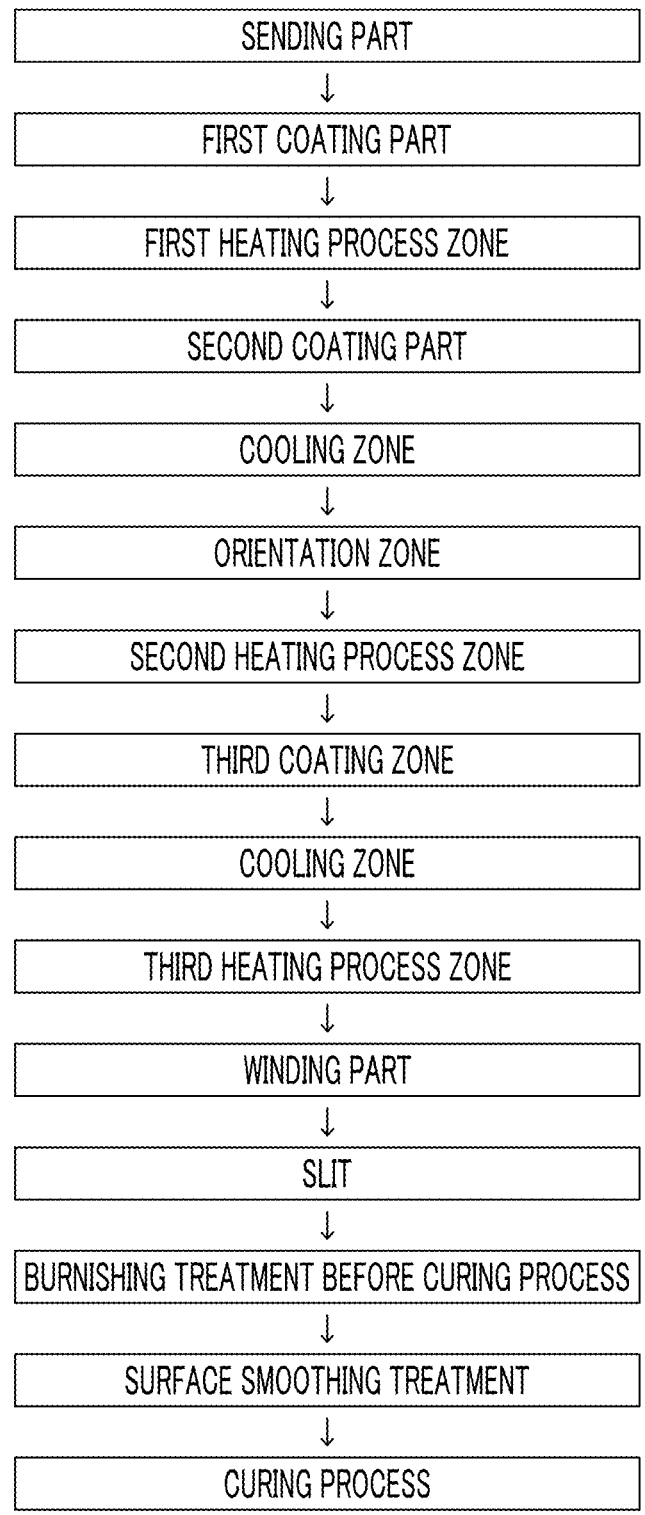
FIG. 4 shows an example (step schematic view) of a specific aspect of a magnetic tape manufacturing step.

FIG. 4 is a step schematic view showing a specific aspect of a step of manufacturing the magnetic tape including a non-magnetic layer and a magnetic layer in this order on one surface side of a non-magnetic support and including a back coating layer on the other surface side thereof. In the aspect shown in FIG. 4, an operation of sending a non-magnetic support (elongated film) from a sending part and winding the non-magnetic support around a winding part is continuously performed, and various processes of coating, drying, and orientation are performed in each part or each zone shown in FIG. 4, and thus, it is possible to sequentially form a non-magnetic layer and a magnetic layer on one surface side of the running non-magnetic support by successive multilayer coating and to form a back coating layer on the other surface side thereof. Such a manufacturing method can be set to be identical to the manufacturing method normally performed for manufacturing a coating type magnetic recording medium, except for including a cooling zone in the magnetic layer forming step, including a cooling zone in the back coating layer forming step, and including the burnishing treatment step before the curing process.

The non-magnetic layer forming composition is applied onto the non-magnetic support sent from the sending part in a first coating part (coating step of non-magnetic layer forming composition).

After the coating step, in a first heating process zone, the coating layer of the non-magnetic layer forming composition formed in the coating step is heated after to dry the coating layer (heating and drying step). The heating and drying step can be performed by causing the non-magnetic support including the coating layer of the non-magnetic layer forming composition to pass through the heated atmosphere. An atmosphere temperature of the heated atmosphere here can be, for example, approximately 60° to 140°. Here, the atmosphere temperature may be a temperature at which the solvent is volatilized and the coating layer is dried, and the atmosphere temperature is not limited to the range described above. In addition, the heated air may blow to the surface of the coating layer. The points described above are also applied to a heating and drying step of a second heating process zone and a heating and drying step of a third heating process zone which will be described later, in the same manner.

Next, in a second coating part, the magnetic layer forming composition is applied onto the non-magnetic layer formed by performing the heating and drying step in the first heating process zone (coating step of magnetic layer forming composition).

After the coating step, a coating layer of the magnetic layer forming composition formed in the coating step is cooled in a cooling zone (cooling step). For example, it is possible to perform the cooling step by allowing the non-magnetic support on which the coating layer of the magnetic layer forming composition is formed on the non-magnetic layer to pass through a cooling atmosphere. An atmosphere temperature of the cooling atmosphere is preferably in a range of $-10°$ C. to 0° C. and more preferably in a range of $-5°$ C. to 0° C. The time for performing the cooling step (for example, time while an arbitrary part of the coating layer is delivered to and sent from the cooling zone (hereinafter, also referred to as a "staying time")) is not particularly limited. When the staying time is long, the value of logarithmic decrement tends to be increased. Thus, the staying time is preferably adjusted by performing preliminary experiment if necessary, so that the magnetic layer side logarithmic decrement equal to or smaller than 0.050 is realized. In the cooling step, cooled air may blow to the surface of the coating layer.

After that, while the coating layer of the magnetic layer forming composition is wet, an orientation process of the ferromagnetic powder in the coating layer is performed in an orientation zone. For the orientation process, a description disclosed in a paragraph 0067 of JP2010-231843A can be referred to.

The coating layer after the orientation process is subjected to the heating and drying step in the second heating process zone.

Next, in the third coating part, a back coating layer forming composition is applied to a surface of the non-magnetic support on a side opposite to the surface where the non-magnetic layer and the magnetic layer are formed, to form a coating layer (coating step of back coating layer forming composition).

After the coating step, a coating layer of the back coating layer forming composition formed in the coating step is cooled in a cooling zone (cooling step). For example, it is possible to perform the cooling step by allowing the non-magnetic support on which the coating layer of the back coating layer forming composition is formed to pass through a cooling atmosphere. An atmosphere temperature of the cooling atmosphere is preferably in a range of $-10°$ C. to 0° C. and more preferably in a range of $-5°$ C. to 0° C. The time for performing the cooling step (for example, time while an arbitrary part of the coating layer is delivered to and sent from the cooling zone (staying time)) is not particularly limited. When the staying time is long, the back coating layer side C—H derived C concentration tends to be increased. Thus, the staying time is preferably adjusted by performing preliminary experiment if necessary, so that the back coating layer side C—H derived C concentration equal to or greater than 35 atom % is realized. In the cooling step here, cooled air may also blow to the surface of the coating layer.

After that, the coating layer after the cooling step is heated and dried in the third heating process zone.

By doing so, it is possible to obtain the magnetic tape including the coating layer of the magnetic layer forming composition heated and dried on the non-magnetic layer, on one surface side of the non-magnetic support, and the back coating layer on the other surface side thereof. The magnetic tape obtained here becomes a magnetic tape product after performing various processes which will be described later.

The obtained magnetic tape is wound around the winding part, and cut (slit) to have a size of a magnetic tape product. The slitting is performed by using a well-known cutter.

In the slit magnetic tape, the burnishing treatment is performed with respect to the surface of the heated and dried coating layer of the magnetic layer forming composition, before performing the curing process (heating and light irradiation) in accordance with the types of the curing agent included in the magnetic layer forming composition (burnishing treatment step between heating and drying step and curing step). The inventors have surmised that removing the viscous component moved to the surface and/or the surface layer part of the coating layer cooled in the cooling zone by the burnishing treatment contributes setting the logarithmic decrement to be equal to or smaller than 0.050. However, this is merely a surmise, and the invention is not limited thereto.

The burnishing treatment is treatment of rubbing a surface of a treatment target with a member (for example, a polishing tape, or a grinding tool such as a grinding blade or a grinding wheel), and can be performed in the same manner as the well-known burnishing treatment for manufacturing a coating type magnetic recording medium. However, in the related art, the burnishing treatment was not performed in a stage before the curing step, after performing the cooling step and the heating and drying step. With respect to this, the magnetic layer side logarithmic decrement can be equal to or smaller than 0.050 by performing the burnishing treatment in the stage described above. This point was newly found by the inventors.

The burnishing treatment can be preferably performed by performing one or both of rubbing of the surface of the coating layer of the treatment target by a polishing tape (polishing) and rubbing of the surface of the coating layer of the treatment target by a grinding tool (grinding). In a case where the magnetic layer forming composition includes an abrasive, it is preferable to use a polishing tape including at least one kind of an abrasive having higher Mohs hardness than that of the abrasive described above. As the polishing tape, a commercially available product may be used and a polishing tape manufactured by a well-known method may be used. As the grinding tool, a well-known blade such as a fixed blade, a diamond wheel, or a rotary blade, or a grinding blade can be used. In addition, a wiping treatment of wiping the surface of the coating layer rubbed by the polishing tape and/or the grinding tool with a wiping material. For details of preferred polishing tape, grinding tool, burnishing treatment, and wiping treatment, descriptions disclosed in paragraphs 0034 to 0048, FIG. 1 and examples of JP1994-52544A (JP-H06-52544A) can be referred to. As the burnishing treatment is reinforced, the value of the magnetic layer side logarithmic decrement tends to be decreased. The burnishing treatment can be reinforced as an abrasive having high hardness is used as the abrasive included in the polishing tape, and can be reinforced, as the amount of the abrasive in the polishing tape is increased. In addition, the burnishing treatment can be reinforced as a grinding tool having high hardness is used as the grinding tool. In regards to the burnishing treatment conditions, the burnishing treatment can be reinforced as a sliding speed between the surface of the coating layer of the treatment target and a member (for example, a polishing tape or a grinding tool) is increased. The sliding speed can be increased by increasing one or both of a speed at which the member is moved, and a speed at which the magnetic tape of the treatment target is moved.

After the burnishing treatment (burnishing treatment step), the curing process is performed with respect to the coating layer of the magnetic layer forming composition. In the aspect shown in FIG. 4, the coating layer of the magnetic layer forming composition is subjected to the surface smoothing treatment, after the burnishing treatment and before the curing process. The surface smoothing treatment is preferably performed by a calender process. For details of the calender process, for example, description disclosed in a paragraph 0026 of JP2010-231843A can be referred to. As the calender process is reinforced, the surface of the magnetic tape can be smoothened. That is, the value of the magnetic layer side Ra can be decreased. The calender process is reinforced as the surface temperature (calender temperature) of a calender roll is increased and/or as calender pressure is increased.

After that, the curing process according to the type of the curing agent included in the coating layer is performed with respect to the coating layer of the magnetic layer forming composition (curing process). The curing process can be performed by the process according to the type of the curing agent included in the coating layer, such as a heating process or light irradiation. The curing process conditions are not particularly limited, and the curing process conditions may be suitably set in accordance with the list of the magnetic layer forming composition used in the coating layer formation, the type of the curing agent, and the thickness of the coating layer. For example, in a case where the coating layer is formed by using the magnetic layer forming composition including polyisocyanate as the curing agent, the curing process is preferably the heating process. In a case where the curing agent is included in a layer other than the magnetic layer, a curing reaction of the layer can also be promoted by the curing process here. Alternatively, the curing step may be separately provided. After the curing step, the burnishing treatment may be further performed.

As described above, it is possible to obtain the magnetic tape according to one aspect of the invention. However, the manufacturing method described above is merely an example. In order to adjust the magnetic layer side logarithmic decrement, the back coating layer side C—H derived C concentration, and the magnetic layer side Ra, other arbitrary methods can be used, and a magnetic tape manufactured by such methods is also included in the invention, as long as the magnetic layer side logarithmic decrement, the back coating layer side C—H derived C concentration, and the magnetic layer side Ra are respectively in the ranges described above.

It is thought that carbon black tends to be hardly adsorbed to the component selected from the group consisting of fatty acid and fatty acid amide, compared to various non-magnetic powders other than carbon black. Accordingly, the inventors have surmised that as a percentage of carbon black occupying the non-magnetic powder included in the back coating layer is high, the component selected from the group consisting of fatty acid and fatty acid amide is easily moved from a layer inner part of the back coating layer to a surface layer part, and the back coating layer side C—H derived C concentration tends to be increased. From this point, as a controlling method of the back coating layer side C—H derived C concentration, a method of adjusting the percentage of carbon black occupying the non-magnetic powder of the back coating layer can also be used.

The magnetic tape according to one aspect of the invention described above is accommodated in a magnetic tape cartridge and can be used for recording, storing, and reproducing information as a magnetic signal. In the magnetic tape cartridge, the magnetic tape is generally accommodated in a cartridge main body in a state of being wound around a reel. The reel is rotatably provided in the cartridge main body. As the magnetic tape cartridge, a single reel type magnetic tape cartridge including one reel in a cartridge main body and a twin reel type magnetic tape cartridge including two reels in a cartridge main body are widely used. When the single reel type magnetic tape cartridge is mounted in a drive (magnetic recording and reproducing device) in order to record and/or reproduce data (magnetic signals) to the magnetic tape, the magnetic tape is drawn from the magnetic tape cartridge and wound around the reel on the drive side. A magnetic head is disposed on a tape transportation path from the magnetic tape cartridge to a winding reel. Sending and winding of the magnetic tape are performed between a reel (supply reel) on the magnetic tape cartridge side and a reel (winding reel) on the drive side. In the meantime, the magnetic head comes into contact with (slides on) the surface of the magnetic layer of the magnetic tape, and accordingly, the recording and/or reproduction of the magnetic signal is performed. With respect to this, in the twin reel type magnetic tape cartridge, both reels of the supply reel and the winding reel are provided in the magnetic tape cartridge. The magnetic tape according to one aspect of the invention may be accommodated in any of single reel type magnetic tape cartridge and twin reel type magnetic tape cartridge. The configuration of the magnetic tape cartridge is well known.

The magnetic tape for archive is stored for a long time in a state of being wound around the magnetic tape cartridge, after the data (magnetic signal) is recorded. Since the magnetic tape according to one aspect of the invention has excellent surface smoothness of the magnetic layer, it is possible to exhibit excellent electromagnetic conversion characteristics and to prevent deterioration of electromagnetic conversion characteristics after the long-term storage.

EXAMPLES

Hereinafter, the invention will be described with reference to examples. However, the invention is not limited to aspects shown in the examples. "Parts" and "%" in the following description mean "parts by mass" and "mass %", unless otherwise noted.

Examples 1 to 9 and Comparative Examples 1 to 9

1. Preparation of Alumina Dispersion 3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a polyester polyurethane resin having a $SO_3Na$ group as a polar group (UR-4800 (amount of a polar group: 80 meq/kg) manufactured by Toyobo Co., Ltd.), and 570.0 parts of a mixed solution of methyl ethyl ketone and cyclohexanone (mass ratio of 1:1) as a solvent were mixed in 100.0 parts of alumina powder (HIT-80 manufactured by Sumitomo Chemical Co., Ltd.) having an gelatinization ratio of 65% and a BET specific surface area of 20 $m^2/g$, and dispersed in the presence of zirconia beads by a paint shaker for 5 hours. After the dispersion, the dispersion liquid and the beads were separated by a mesh and an alumina dispersion was obtained.

2. Magnetic Layer Forming Composition List
Magnetic Solution
Ferromagnetic hexagonal ferrite powder: 100.0 parts
Average particle size: 21 nm
$SO_3Na$ group-containing polyurethane resin: 14.0 parts
Weight-average molecular weight: 70,000, $SO_3Na$ group: 0.2 meq/g
Cyclohexanone: 150.0 parts
Methyl ethyl ketone: 150.0 parts
Abrasive liquid
Alumina dispersion prepared in the section 1: 6.0 parts
Silica Sol
Colloidal silica: 2.0 parts
Average particle size of 100 nm
Methyl ethyl ketone: 1.4 parts
Other Components
Stearic acid: 2.0 parts
Stearic acid amide: 0.2 parts
Butyl stearate: 2.0 parts
Polyisocyanate (CORONATE (registered trademark) L manufactured by Nippon Polyurethane Industry): 2.5 parts
Finishing Additive Solvent
Cyclohexanone: 200.0 parts
Methyl ethyl ketone: 200.0 parts 3. Non-Magnetic Layer Forming Composition List
Non-magnetic inorganic powder: α-iron oxide: 100.0 parts
Average particle size (average long axis length): 0.15 μm
Average acicular ratio: 7
BET specific surface area: 52 $m^2/g$
Carbon black: 20.0 parts
Average particle size: 20 nm
A vinyl chloride copolymer: 13.0 parts
$SO_3Na$ group-containing polyurethane resin: 9.0 parts
Weight-average molecular weight: 70,000, $SO_3Na$ group: 0.2 meq/g
Phenylphosphonic acid: 3.0 parts
Stearic acid: 2.0 parts
Stearic acid amide: 0.2 parts
Butyl stearate: 2.0 parts
Cyclohexanone: 300.0 parts
Methyl ethyl ketone: 300.0 parts 4. Back Coating Layer Forming Composition List
Non-magnetic inorganic powder: α-iron oxide: 80.0 parts
Average particle size (average long axis length): 0.15 μm
Average acicular ratio: 7
BET specific surface area: 52 $m^2/g$
Carbon black: 20.0 parts
Average particle size: 20 nm
A vinyl chloride copolymer: 13.0 parts
$SO_3Na$ group-containing polyurethane resin: 6.0 parts
Phenylphosphonic acid: 3.0 parts
Methyl ethyl ketone: 155.0 parts
Stearic acid: 2.0 parts
Stearic acid amide: 0.2 parts
Butyl stearate: 2.0 parts
Polyisocyanate: 5.0 parts
Cyclohexanone: 355.0 parts 5. Preparation of Each Layer Forming Composition The magnetic layer forming composition was prepared by the following method. The magnetic solution was prepared by dispersing (beads-dispersing) each component with a batch type vertical sand mill for 24 hours. As the dispersion beads, zirconia beads having a bead diameter of 0.1 mm were used. The prepared magnetic solution and the abrasive liquid were mixed with other components (silica sol, other components, and finishing additive solvent) and beads-dispersed for 5 minutes by using the sand mill, and a process (ultrasonic dispersion) was performed with a batch type ultrasonic device (20 kHz, 300 W) for 0.5 minutes. After that, the filtering was performed by using a filter having an average hole diameter of 0.5 μm, and the magnetic layer forming composition was prepared.

The non-magnetic layer forming composition was prepared by the following method. Each component excluding a lubricant (stearic acid, stearic acid amide, and butyl stearate), cyclohexanone, and methyl ethyl ketone was dispersed by using batch type vertical sand mill for 24 hours to obtain dispersion liquid. As the dispersion beads, zirconia beads having a bead diameter of 0.1 mm were used. After that, the remaining components were added into the obtained dispersion liquid and stirred with a dissolver. The dispersion liquid obtained as described above was filtered with a filter having an average hole diameter of 0.5 μm and a non-magnetic layer forming composition was prepared.

The back coating layer forming composition was prepared by the following method. Each component excluding the lubricant (stearic acid, stearic acid amide, and butyl stearate), polyisocyanate, and cyclohexanone was kneaded and diluted by an open kneader, and subjected to a dispersing process of 12 passes, with a transverse beads mill dispersion device and zirconia beads having a bead diameter of 1 mm, by setting a bead filling percentage as 80 volume %, a circumferential speed of rotor distal end as 10 m/sec, and a retention time for 1 pass as 2 minutes. After that, the remaining components were added into the obtained dispersion liquid and stirred with a dissolver. The dispersion liquid obtained as described above was filtered with a filter having an average hole diameter of 1 μm and a back coating layer forming composition was prepared.

6. Manufacturing of Magnetic Tape

A magnetic tape was manufactured by the specific aspect shown in FIG. 4. The magnetic tape was specifically manufactured as follows.

A support made of polyethylene naphthalate having a thickness of 4.50 μm was sent from the sending part, and the non-magnetic layer forming composition prepared in the section 5 was applied to one surface thereof so that the thickness after the drying becomes 0.40 µm in the first coating part and was dried in the first heating process zone (atmosphere temperature of 100° C.) to form a coating layer.

Then, the magnetic layer forming composition prepared in the section 5 was applied onto the non-magnetic layer so that the thickness after the drying becomes 60 nm in the second coating part, and a coating layer was formed. The cooling step was performed by passing the formed coating layer through the cooling zone in which the atmosphere temperature is adjusted to 0° C. for the staying time shown in Table 5 while the coating layer is wet, a vertical orientation process was performed in the orientation zone by applying a magnetic field having a magnetic field strength of 0.3 T in a vertical direction, and then, the coating layer was dried in the second heating process zone (atmosphere temperature of 100° C.) at an atmosphere temperature of 100° C.

After that, in the third coating part, the back coating layer forming composition prepared in the section 5 was applied to the surface of the support made of polyethylene naphthalate on a side opposite to the surface where the non-magnetic layer and the magnetic layer are formed, so that the thickness after the drying becomes 0.60 to form a coating layer, and the cooling step was performed by passing the formed coating layer through the cooling zone in which the atmosphere temperature is adjusted to 0° C. for the staying time shown in Table 5 while the coating layer is wet. Then, the coating layer was dried in the third heating process zone (atmosphere temperature of 100° C.).

The magnetic tape obtained as described above was slit to have a width of ½ inches (0.0127 meters), and the burnishing treatment and the wiping treatment were performed with respect to the surface of the coating layer of the magnetic layer forming composition. The burnishing treatment and the wiping treatment were performed by using a commercially available polishing tape (product name: MA22000 manufactured by Fujifilm Holdings Corporation, abrasive: diamond/$Cr_2O_3$/red oxide) as the polishing tape, a commercially available sapphire blade (manufactured by Kyocera Corporation, a width of 5 mm, a length of 35 mm, and a tip angle of 60 degrees) as the grinding blade, and a commercially available wiping material (product name: WRP736 manufactured by Kuraray Co., Ltd) as the wiping material, in a treatment device having a configuration disclosed in FIG. 1 of JP1994-52544A (JP-H06-52544A). For the treatment conditions, the treatment conditions disclosed in Example 12 of JP1994-52544A (JP-H06-52544A).

After the burnishing treatment and the wiping treatment, a calender process (surface smoothing treatment) was performed with a calender roll configured of only a metal roll, at a speed of 80 m/min, linear pressure of 300 kg/cm (294 kN/m), and a surface temperature of a calender roll shown in Table 5.

Then, the curing process (heating process) was performed in the environment of the atmosphere temperature of 70° C. for 36 hours to obtain a magnetic tape.

In Table 5, in the comparative examples in which "not performed" is disclosed in a column of the cooling zone staying time of the magnetic layer forming step, a magnetic tape was manufactured by a manufacturing step not including the cooling zone in the magnetic layer forming step.

In Table 5, in the comparative examples in which "not performed" is disclosed in a column of the cooling zone staying time of the back coating layer forming step, a magnetic tape was manufactured by a manufacturing step not including the cooling zone in the back coating layer forming step.

In Table 5, in the comparative examples in which "not performed" is disclosed in a column of the burnishing treatment before the curing step of the magnetic layer forming step and "performed" is disclosed in a column of the burnishing treatment after the curing step, a magnetic tape was manufactured by performing the burnishing treatment and the wiping treatment after the curing process, without performing the burnishing treatment and the wiping treatment before the curing process.

Each magnetic tape of Examples 1 to 9 and Comparative Examples 1 to 9 was manufactured by the steps described above. The following evaluations are performed regarding the manufactured magnetic tape.

Evaluation Method

1. Magnetic Layer Side Ra

The measurement regarding a measurement area of 40 µm×40 µm was performed with an atomic force microscope (AFM, Nanoscope 4 manufactured by Veeco Instruments, Inc.), and a center line average surface roughness Ra of the surface of the magnetic layer of the magnetic tape was acquired. A scan speed (probe movement speed) was set as 40 µm/sec and a resolution was set as 512 pixel×512 pixel.

2. Magnetic Layer Side Logarithmic Decrement

The logarithmic decrement of the surface of the magnetic layer of each magnetic tape of Examples and Comparative Examples was acquired by the method described above by using a rigid-body pendulum type physical properties testing instrument RPT-3000W (pendulum: brass, substrate: glass substrate, a rate of temperature increase of substrate: 5° C./min) as the measurement device. A measurement sample cut out from each magnetic tape of Examples and Comparative Examples was placed on a glass substrate having a size of approximately 3 cm×approximately 5 cm, by being fixed at 4 portions with a fixing tape (Kapton tape manufactured by Du Pont-Toray Co., Ltd.) as shown in FIG. 3. An adsorption time was set as 1 second, a measurement interval was set as 7 to 10 seconds, a displacement-time curve was drawn regarding the 86-th measurement interval, and the logarithmic decrement was acquired by using this curve. The measurement was performed in the environment of relative humidity of approximately 50%.

3. Back Coating Layer Side C—H Derived C Concentration

The X-ray photoelectron spectroscopic analysis was performed regarding the surface of the back coating layer of a measurement sample cut out from each magnetic tape of Examples and Comparative Examples (measurement region: 300 µm×700 µm) by the following method using an ESCA device, and a back coating layer side C—H Derived C Concentration was calculated from the analysis result.

Analysis and Calculation Method

All of the measurement (1) to (3) described below were performed under the measurement conditions shown in Table 1.

TABLE 1

| Device | AXIS-ULTRA manufactured by Shimadzu Corporation |
|---|---|
| Excitation X-ray source | Monochromatic Al-Kα ray (output: 15 kV, 20 mA) |
| Analyzer mode | Spectrum |
| Lens mode | Hybrid (analysis area: 300 µm × 700 µm) |
| Neutralization electron gun for charge correction (Charge neutraliser) | ON (used) |

TABLE 1-continued

| Light electron extraction angle (take-off angle) | 10 deg. (angle formed by a detector and a sample surface) |
|---|---|

(1) Wide Scan Measurement

A wide scan measurement (measurement conditions: see Table 2) was performed regarding the surface of the back coating layer of the measurement sample with the ESCA device, and the types of the detected elements were researched (qualitative analysis).

TABLE 2

| Scan range | Pass Energy | Energy resolution (Step) | Capturing time (Dwell) | Number of integration times (Sweeps) |
|---|---|---|---|---|
| 0 to 1200 eV | 160 eV | 1 eV/step | 100 ms/step | 5 |

(2) Narrow Scan Measurement

All elements detected in (1) described above were subjected to narrow scan measurement (measurement conditions: see Table 3). An atom concentration (unit: atom %) of each element detected was calculated from a peak surface area of each element by using software for a data process attached to the device (Vision 2.2.6). Here, the C concentration was also calculated.

TABLE 3

| Spectra[Note 1] | Scan range | Pass Energy | Energy resolution (Step) | Capturing time (Dwell) | Number of integration times (Sweeps)[Note 2] |
|---|---|---|---|---|---|
| C1s | 276 to 296 eV | 80 eV | 0.1 eV/step | 100 ms/step | 3 |
| Cl2p | 190 to 212 eV | 80 eV | 0.1 eV/step | 100 ms/step | 5 |
| N1s | 390 to 410 eV | 80 eV | 0.1 eV/step | 100 ms/step | 5 |
| O1s | 521 to 541 eV | 80 eV | 0.1 eV/step | 100 ms/step | 3 |
| Fe2p | 700 to 740 eV | 80 eV | 0.1 eV/step | 100 ms/step | 3 |
| Ba3d | 765 to 815 eV | 80 eV | 0.1 eV/step | 100 ms/step | 3 |
| Al2p | 64 to 84 eV | 80 eV | 0.1 eV/step | 100 ms/step | 5 |
| Y3d | 148 to 168 eV | 80 eV | 0.1 eV/step | 100 ms/step | 3 |
| P2p | 120 to 140 eV | 80 eV | 0.1 eV/step | 100 ms/step | 5 |
| Zr3d | 171 to 191 eV | 80 eV | 0.1 eV/step | 100 ms/step | 5 |
| Bi4f | 151 to 171 eV | 80 eV | 0.1 eV/step | 100 ms/step | 3 |
| Sn3d | 477 to 502 eV | 80 eV | 0.1 eV/step | 100 ms/step | 5 |
| Si2p | 90 to 110 eV | 80 eV | 0.1 eV/step | 100 ms/step | 5 |
| S2p | 153 to 173 eV | 80 eV | 0.1 eV/step | 100 ms/step | 5 |

[Note 1] Spectra shown in Table 3 (element type) are examples, and in a case where an element not shown in Table 3 is detected by the qualitative analysis of the section (1), the same narrow scan measurement is performed in a scan range including entirety of spectra of the elements detected.
[Note 2] The spectra having excellent signal-to-noise ratio (S/N ratio) were measured when the number of integration times is set as three times. However, even when the number of integration times regarding the entirety of spectra is set as five times, the quantitative results are not affected.

(3) Acquiring of C1s Spectra

The C1s spectra were acquired under the measurement conditions disclosed in Table 4. Regarding the acquired C1s spectra, after correcting a shift (physical shift) due to a sample charge by using software for a data process attached to the device (Vision 2.2.6), a fitting process (peak resolution) of the C1s spectra was performed by using the software described above. In the peak resolution, the fitting of C1s spectra was performed by a nonlinear least-squares method using a Gauss-Lorentz complex function (Gaussian component: 70%, Lorentz component: 30%), and a percentage (peak area ratio) of the C—H peak occupying the C1s spectra was calculated. A C—H derived C concentration was calculated by multiplying the calculated C—H peak area ratio by the C concentration acquired in (2) described above.

TABLE 4

| Spectra | Scan range | Pass Energy | Energy resolution (Step) | Capturing time (Dwell) | Number of integration times (Sweeps) |
|---|---|---|---|---|---|
| C1s | 276 to 296 eV | 10 eV | 0.1 eV/step | 200 ms/step | 20 |

An arithmetical mean of values obtained by performing the above-mentioned process at different positions of the surface of the back coating layer of the measurement sample three times was set as the back coating layer side C—H derived C concentration.

4. Electromagnetic Conversion Characteristics (Signal-to-Noise-Ratio (SNR)) Before and after Acceleration Test Corresponding to Long-Term Storage Two tape samples were prepared in order to perform SNR measurement regarding each magnetic tape of Examples and Comparative Examples before and after the acceleration test corresponding to long-term storage. One tape sample was used in the SNR measurement without performing the acceleration test corresponding to long-term storage. The other tape sample was used in the SNR measurement after the acceleration test corresponding to long-term storage. The acceleration test corresponding to long-term storage was performed by storing the tape sample having a total length of 1,000 m in the environment of a temperature of 40° C. and relative humidity of 80% for 5 days in a state of being wound around a reel. This acceleration test corresponds to the storage of 10 years or longer in the environment of room temperature (approximately 20° C. to 25° C.).

The electromagnetic conversion characteristics (SNR) were measured by the following method by using a reel tester having a width of ½ inches (0.0127 meters) and including a fixed head.

A head/tape relative speed was set as 5.5 m/sec, a metal-in-gap (MIG) head (gap length of 0.15 μm, track width of 1.0 μm) was used in the recording, and a recording current was set as an optimal recording current of each tape sample. As a reproducing head, a giant-magnetoresistive (GMR) head having an element thickness of 15 nm, a shield interval 0.1 μm, and a lead width of 0.5 μm was used. The recording was performed at linear recording density of 350 KFci, and measurement regarding a reproduction signal was performed with a spectrum analyzer manufactured by Shibasoku Co., Ltd. Regarding the signal, a signal which was sufficiently stabilized after starting the running of the tape sample was used. A ratio of an output value of a carrier signal and integrated noise of the entire spectral range was set as a SNR (Broadband-SNR; BB-SNR).

The SNR is shown in Table 5 as a relative value when the SNR before the acceleration test of Comparative Example 1 was set as a reference (0 dB). When the SNR before the acceleration test measured by the method described above is equal to or greater than 1.0 dB and the minimum SNR (SNR after acceleration test—SNR before acceleration test) is within −0.5 dB, it is possible to determine that the magnetic tape is a magnetic tape showing excellent electromagnetic conversion characteristics desired for a recording medium for archive.

The results described above are shown in Table 5.

TABLE 5

|  |  | Example 1 | Example 2 | Example 3 | Example 4 | Example 5 |
|---|---|---|---|---|---|---|
| Magnetic layer forming step | Cooling zone staying time | 1 second | 60 seconds | 120 seconds | 180 seconds | 60 seconds |
|  | Burnishing treatment before curing step | Performed | Performed | Performed | Performed | Performed |
|  | Burnishing treatment after curing step | Not performed | Not performed | Not performed | Not performed | Not performed |
|  | Calender roll surface temperature | 100° C. | 100° C. | 100° C. | 100° C. | 100° C. |
| Back coating layer forming step | Cooling zone staying time | 50 seconds | 50 seconds | 50 seconds | 50 seconds | 1 second |
| Magnetic layer side Ra |  | 1.8 nm | 1.8 nm | 1.8 nm | 1.8 nm | 1.8 nm |
| Magnetic layer side logarithmic decrement |  | 0.048 | 0.034 | 0.021 | 0.015 | 0.034 |
| Back coating layer side C—H derived C concentration |  | 48 atom % | 48 atom % | 48 atom % | 48 atom % | 35 atom % |
| BB-SNR | Before acceleration test | 1.5 dB | 1.5 dB | 1.5 dB | 1.5 dB | 1.5 dB |
|  | After acceleration test | 1.0 dB | 1.2 dB | 1.4 dB | 1.4 dB | 1.1 dB |
|  | Decreased amount (after acceleration test − before acceleration test) | −0.5 dB | −0.3 dB | −0.1 dB | −0.1 dB | −0.5 dB |

|  |  | Example 6 | Example 7 | Example 8 | Example 9 |
|---|---|---|---|---|---|
| Magnetic layer forming step | Cooling zone staying time | 60 seconds | 60 seconds | 60 seconds | 60 seconds |
|  | Burnishing treatment before curing step | Performed | Performed | Performed | Performed |
|  | Burnishing treatment after curing step | Not performed | Not performed | Not performed | Not performed |
|  | Calender roll surface temperature | 100° C. | 100° C. | 110° C. | 120° C. |
| Back coating layer forming step | Cooling zone staying time | 100 seconds | 180 seconds | 50 seconds | 50 seconds |
| Magnetic layer side Ra |  | 1.8 nm | 1.8 nm | 1.6 nm | 1.4 nm |
| Magnetic layer side logarithmic decrement |  | 0.034 | 0.034 | 0.034 | 0.034 |
| Back coating layer side C—H derived C concentration |  | 55 atom % | 60 atom % | 48 atom % | 48 atom % |
| BB-SNR | Before acceleration test | 1.5 dB | 1.5 dB | 3.2 dB | 4.6 dB |
|  | After acceleration test | 1.4 dB | 1.4 dB | 3.0 dB | 4.4 dB |
|  | Decreased amount (after acceleration test − before acceleration test) | −0.1 dB | −0.1 dB | −0.2 dB | −0.2 dB |

|  |  | Comparative Example 1 | Comparative Example 2 | Comparative Example 3 | Comparative Example 4 | Comparative Example 5 |
|---|---|---|---|---|---|---|
| Magnetic layer forming step | Cooling zone staying time | Not performed | Not performed | Not performed | Not performed | 60 seconds |
|  | Burnishing treatment before curing step | Not performed | Not performed | Not performed | Not performed | Not performed |

TABLE 5-continued

| | | | | | | |
|---|---|---|---|---|---|---|
| | Burnishing treatment after curing step | Performed | Performed | Performed | Performed | Performed |
| | Calender roll surface temperature | 90° C. | 100° C. | 110° C. | 120° C. | 100° C. |
| Back coating layer forming step | Cooling zone staying time | Not performed | Not performed | Not performed | Not performed | Not performed |
| | Magnetic layer side Ra | 2.3 nm | 1.8 nm | 1.6 nm | 1.4 nm | 1.8 nm |
| | Magnetic layer side logarithmic decrement | 0.062 | 0.062 | 0.062 | 0.062 | 0.084 |
| | Back coating layer side C—H derived C concentration | 25 atom % | 25 atom % | 25 atom % | 25 atom % | 25 atom % |
| BB-SNR | Before acceleration test | 0 dB | 1.5 dB | 3.0 dB | 4.5 dB | 1.5 dB |
| | After acceleration test | −0.5 dB | 0.5 dB | 0.9 dB | 1.2 dB | 0.2 dB |
| | Decreased amount (after acceleration test − before acceleration test) | −0.5 dB | −1.0 dB | −2.1 dB | −3.3 dB | −1.3 dB |

| | | Comparative Example 6 | Comparative Example 7 | Comparative Example 8 | Comparative Example 9 |
|---|---|---|---|---|---|
| Magnetic layer forming step | Cooling zone staying time | 60 seconds | 180 seconds | Not performed | Not performed |
| | Burnishing treatment before curing step | Performed | Performed | Not performed | Not performed |
| | Burnishing treatment after curing step | Not performed | Not performed | Performed | Performed |
| | Calender roll surface temperature | 100° C. | 100° C. | 100° C. | 100° C. |
| Back coating layer forming step | Cooling zone staying time | Not performed | Not performed | 50 seconds | 180 seconds |
| | Magnetic layer side Ra | 1.8 nm | 1.8 nm | 1.8 nm | 1.8 nm |
| | Magnetic layer side logarithmic decrement | 0.034 | 0.015 | 0.062 | 0.062 |
| | Back coating layer side C—H derived C concentration | 25 atom % | 25 atom % | 48 atom % | 60 atom % |
| BB-SNR | Before acceleration test | 1.5 dB | 1.5 dB | 1.5 dB | 1.5 dB |
| | After acceleration test | 0.6 dB | 0.5 dB | 0.5 dB | 0.6 dB |
| | Decreased amount (after acceleration test − before acceleration test) | −0.9 dB | −1.0 dB | −1.0 dB | −0.9 dB |

From the results shown in Table 5, it is possible to confirm that the magnetic tape of Examples shows a high SNR before the acceleration test corresponding to the long-term storage corresponding to data storage of a recording medium for archive, and shows a high SNR even after the acceleration test with less minimum SNR.

Reference Experiment: Confirmation of Contribution of Fatty Acid and Fatty Acid Amide with Respect to Back Coating Layer Side C—H Derived C Concentration (1) Two magnetic tapes (tape samples) were manufactured by the same method as that in Example 1. The measurement regarding one tape sample was performed by the ESCA device, and then, the solvent extraction of the other tape sample was performed in a non-measured state (solvent: methanol).

When the quantity of fatty acid, fatty acid amide, and fatty acid ester in the solution obtained by the extraction was determined by gas chromatography analysis, a difference in the quantitative values of fatty acid (stearic acid) and fatty acid amide (stearic acid amide) in the two tape samples was not obtained. Meanwhile, the quantitative value of fatty acid ester (butyl stearate) in the tape sample after the measurement was a value which is significantly lower than the quantitative value thereof in the non-measured tape sample. This is because fatty acid ester is volatilized in a vacuum chamber in which a measurement target sample is disposed during the measurement in the ESCA device.

From the results described above, it is possible to determine that fatty acid ester does not affect the back coating layer side C—H derived C concentration acquired by the analysis performed by ESCA.

(2) Among the components included in the back coating layer forming composition, the organic compounds excluding the solvent are stearic acid, stearic acid amide, butyl stearate, a vinyl chloride copolymer, a polyurethane resin, and phenylphosphonic acid. Among the components, it is possible to determine that butyl stearate does not affect the back coating layer side C—H derived C concentration, from the results (1).

Next, the effect of a vinyl chloride copolymer, a polyurethane resin, and phenylphosphonic acid with respect to the back coating layer side C—H derived C concentration was confirmed by the following method.

Regarding a vinyl chloride copolymer, a polyurethane resin, and phenylphosphonic acid used in Example 1, C1s spectra were acquired by the same method as that described above, and regarding the acquired spectra, peak resolution of a peak positioned at the vicinity of bonding energy 286 eV and a C—H peak was performed by the process described above. A percentage (peak area ratio) of the separated peak occupying the C1s spectra was calculated, and the peak area ratio of the peak positioned at the vicinity of bonding energy 286 eV and the C—H peak was calculated.

Then, in the C1s spectra acquired in Example 1, the peak resolution of the peak positioned at the vicinity of bonding energy 286 eV was performed by the process described above. A vinyl chloride copolymer, a polyurethane resin, and phenylphosphonic acid have the peak positioned at the vicinity of bonding energy 286 eV in the C1s spectra, whereas fatty acid (stearic acid) and fatty acid amide (stearic acid amide) do not have a peak at the position described above. Accordingly, it is possible to determine that the peak positioned at the vicinity of bonding energy 286 eV of the C1s spectra acquired in Example 1 is derived from a vinyl chloride copolymer, a polyurethane resin, and phenylphosphonic acid. Then, when an amount of contribution of a vinyl chloride copolymer, a polyurethane resin, and phenylphosphonic acid of the C—H peak of the C1s spectra acquired in Example 1 was calculated from the peak area ratio calculated as described above, the amount of contribution thereof was approximately 10%. From this result, it is possible to determine that a large amount (approximately 90%) of the C—H peak of the C1s spectra acquired in Example 1 is derived from fatty acid (stearic acid) and fatty acid amide (stearic acid amide).

From the result described above, it was confirmed that the back coating layer side C—H derived C concentration can be an index of the presence amount of fatty acid and fatty acid amide.

An aspect of the invention can be effective in technical fields of magnetic tapes used as recording medium for archive.

What is claimed is:

1. A magnetic tape comprising:
   a non-magnetic support;
   a magnetic layer including ferromagnetic powder and a binder on one surface side of the non-magnetic support; and
   a back coating layer including non-magnetic powder and a binder on the other surface side of the non-magnetic support,
   wherein the center line average surface roughness Ra measured regarding the surface of the magnetic layer is equal to or smaller than 1.8 nm,
   the logarithmic decrement acquired by a pendulum viscoelasticity test performed regarding the surface of the magnetic layer is within a range of 0.015 to 0.050,
   the back coating layer includes one or more components selected from the group consisting of fatty acid and fatty acid amide,
   the C—H derived C concentration calculated from the C—H peak area ratio of C1s spectra obtained by X-ray photoelectron spectroscopic analysis performed regarding a surface of the back coating layer at a photoelectron take-off angle of 10 degrees is equal to or greater than 35 atom %, and
   the logarithmic decrement on the magnetic layer side is determined by the following method:

securing a measurement sample of the magnetic tape with the measurement surface, which is the surface on the magnetic layer side, facing upward on a substrate in a pendulum viscoelasticity tester;
   disposing a columnar cylinder edge which is 4 mm in diameter and equipped with a pendulum 13 g in weight on the measurement surface of the measurement sample such that the long axis direction of the columnar cylinder edge runs parallel to the longitudinal direction of the measurement sample;
   raising the surface temperature of the substrate on which the measurement sample has been positioned at a rate of less than or equal to 5° C./min up to 80° C.;
   inducing initial oscillation of the pendulum;
   monitoring the displacement of the pendulum while it is oscillating to obtain a displacement-time curve for a measurement interval of greater than or equal to 10 minutes; and
   obtaining the logarithmic decrement $\Delta$ from the following equation:

$$\Delta = \frac{\ln\left(\frac{A_1}{A_2}\right) + \ln\left(\frac{A_2}{A_3}\right) + \ldots \ln\left(\frac{A_n}{A_{n+1}}\right)}{n}$$

wherein the interval from one minimum displacement to the next minimum displacement is adopted as one wave period; the number of waves contained in the displacement-time curve during one measurement interval is denoted by n, the difference between the minimum displacement and the maximum displacement of the $n^{th}$ wave is denoted by An, and the logarithmic decrement is calculated using the difference between the next minimum displacement and maximum displacement of the $n^{th}$ wave ($A_{n+1}$ in the above equation).

2. The magnetic tape according to claim 1, wherein the logarithmic decrement is 0.015 to 0.035.

3. The magnetic tape according to claim 2, wherein the C—H derived C concentration is 35 atom % to 60 atom %.

4. The magnetic tape according to claim 3, wherein the center line average surface roughness Ra is 1.2 nm to 1.8 nm.

5. The magnetic tape according to claim 2, wherein the center line average surface roughness Ra is 1.2 nm to 1.8 nm.

6. The magnetic tape according to claim 1, wherein the C—H derived C concentration is 35 atom % to 60 atom %.

7. The magnetic tape according to claim 6, wherein the center line average surface roughness Ra is 1.2 nm to 1.8 nm.

8. The magnetic tape according to claim 1, wherein the center line average surface roughness Ra is 1.2 nm to 1.8 nm.

9. The magnetic tape according to claim 1, further comprising:
   a non-magnetic layer including non-magnetic powder and a binder between the non-magnetic support and the magnetic layer.

* * * * *